United States Patent
Walworth et al.

(10) Patent No.: US 7,350,259 B2
(45) Date of Patent: *Apr. 1, 2008

(54) RELATIVE AXIAL TRANSLATION PREVENTION SYSTEM FOR WIPER BLADE ASSEMBLIES

(75) Inventors: Van T. Walworth, Lebanon, TN (US); David B. Hook, Franklin, TN (US); Craig Whitaker, Fairfield, OH (US); Joseph C. Bacarella, LaSalle, MI (US); George Moser, Brighton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/494,272

(22) Filed: Jul. 27, 2006

(65) Prior Publication Data

US 2007/0113366 A1    May 24, 2007

Related U.S. Application Data

(60) Provisional application No. 60/703,281, filed on Jul. 28, 2005.

(51) Int. Cl.
  B60S 1/38    (2006.01)
  B60S 1/40    (2006.01)
(52) U.S. Cl. .............................. 15/250.201; 15/250.32; 15/250.43
(58) Field of Classification Search ............. 15/250.43, 15/250.44, 250.46, 250.451, 250.201, 250.361, 15/250.06, 250.48, 250.32, 250.452, 250.453, 15/250.454

(56) References Cited

U.S. PATENT DOCUMENTS

| | | | |
|---|---|---|---|
| 1,771,824 A | | 7/1930 | Storrie |
| 1,915,775 A | | 6/1933 | Christen |
| 2,036,787 A | | 4/1936 | Zabriskie |
| 2,230,489 A | | 2/1941 | Grossfeld et al. |
| 2,543,383 A | | 2/1951 | Scinta et al. |
| 2,700,785 A | * | 2/1955 | Oishei et al. ............ 15/250.44 |
| 2,794,203 A | | 6/1957 | Oishei |
| 2,937,393 A | | 5/1960 | Brueder |
| 3,009,185 A | | 11/1961 | Adams |
| 3,031,709 A | | 5/1962 | Easterling |
| 3,037,233 A | | 6/1962 | Peras et al. |
| 3,048,872 A | | 8/1962 | Kerrigan |
| 3,082,464 A | | 3/1963 | Smithers |
| 3,088,155 A | | 5/1963 | Smithers |

(Continued)

FOREIGN PATENT DOCUMENTS

CA            721443          11/1965

(Continued)

Primary Examiner—Gary K Graham
(74) Attorney, Agent, or Firm—Harness, Dickey & Pierce, PLC

(57) ABSTRACT

A windshield wiper blade assembly is disclosed which comprises a resilient wiper blade having an axial passage through which a flexible support beam is positioned to provide structure. A universal connector element for connecting the blade assembly to a plurality of different wiper arms crimps onto the blade and support beam assembly approximately midway along the wiper blade in a manner which does not puncture nor interfere with the resilient windshield wiper material, while at the same time preventing the relative axial translation of the support beam within the windshield wiper blade as well as translation between the blade and the connector itself.

21 Claims, 32 Drawing Sheets

U.S. PATENT DOCUMENTS

| | | |
|---|---|---|
| 3,089,174 A | 5/1963 | Bignon |
| 3,093,856 A | 6/1963 | Smithers |
| 3,094,734 A * | 6/1963 | Hoyler ................ 15/250.451 |
| 3,099,031 A | 7/1963 | Ludwig |
| 3,104,412 A | 9/1963 | Hinder |
| 3,107,384 A | 10/1963 | Wise |
| 3,147,506 A | 9/1964 | Williams |
| 3,156,940 A | 11/1964 | Anderson |
| 3,179,969 A | 4/1965 | Glynn |
| 3,192,551 A | 7/1965 | Appel |
| 3,200,431 A | 8/1965 | Thompson |
| 3,208,091 A | 9/1965 | Golub et al. |
| 3,296,647 A | 1/1967 | Gumbleton |
| 3,317,945 A | 5/1967 | Ludwig |
| 3,320,628 A | 5/1967 | Bacher et al. |
| 3,390,416 A | 7/1968 | Scinta |
| 3,393,419 A | 7/1968 | Scinta |
| 3,418,679 A | 12/1968 | Barth et al. |
| 3,425,089 A | 2/1969 | Quinlan et al. |
| 3,430,285 A | 3/1969 | Rickett |
| 3,480,986 A | 12/1969 | Forster |
| 3,541,629 A | 11/1970 | Quinlan et al. |
| 3,657,762 A | 4/1972 | Arman |
| 3,673,631 A | 7/1972 | Yamadai et al. |
| 3,717,900 A | 2/1973 | Quinlan et al. |
| 3,757,377 A | 9/1973 | Hayhurst |
| 3,768,113 A | 10/1973 | Kolb |
| 3,780,395 A | 12/1973 | Quinlan et al. |
| 3,785,002 A | 1/1974 | Quinlan et al. |
| 3,843,994 A | 10/1974 | Smithers |
| 3,872,537 A | 3/1975 | Bianchi |
| 3,874,018 A | 4/1975 | van den Berg et al. |
| 3,875,611 A | 4/1975 | Plisky et al. |
| 3,879,793 A | 4/1975 | Schlegel |
| 3,881,213 A | 5/1975 | Tilli |
| 3,881,214 A | 5/1975 | Palu |
| 3,896,519 A | 7/1975 | Pankow |
| 3,900,917 A | 8/1975 | Baut et al. |
| 3,903,560 A | 9/1975 | Jewell et al. |
| 3,919,736 A | 11/1975 | Bourassa et al. |
| 3,995,347 A | 12/1976 | Kohler |
| 4,014,061 A | 3/1977 | Jurowski et al. |
| 4,023,232 A | 5/1977 | Smithers |
| 4,028,770 A | 6/1977 | Appel |
| 4,057,869 A | 11/1977 | Longman et al. |
| 4,063,328 A | 12/1977 | Arman |
| 4,094,039 A | 6/1978 | Waterman et al. |
| 4,114,227 A | 9/1978 | Blackman |
| 4,118,825 A | 10/1978 | Hoebrechts et al. |
| 4,120,069 A | 10/1978 | Sharp et al. |
| 4,127,916 A * | 12/1978 | van den Berg et al. .. 15/250.43 |
| 4,142,268 A | 3/1979 | Brown et al. |
| 4,177,537 A | 12/1979 | Roadarmel |
| 4,179,766 A | 12/1979 | Weiler et al. |
| 4,180,885 A | 1/1980 | Thornton et al. |
| 4,195,382 A | 4/1980 | Macpherson |
| 4,214,343 A | 7/1980 | Dudek |
| 4,224,001 A | 9/1980 | Arndt et al. |
| 4,290,164 A | 9/1981 | van den Berg |
| 4,293,974 A | 10/1981 | Gowans et al. |
| 4,296,520 A | 10/1981 | Arndt |
| 4,296,521 A | 10/1981 | Mower |
| 4,308,635 A | 1/1982 | Maiocco |
| 4,309,790 A | 1/1982 | Bauer et al. |
| 4,321,725 A | 3/1982 | Journee |
| 4,324,019 A | 4/1982 | Mohnach et al. |
| 4,327,458 A | 5/1982 | Maiocco |
| 4,336,625 A | 6/1982 | Maiocco |
| 4,342,126 A | 8/1982 | Neefeldt |
| 4,343,062 A | 8/1982 | van den Berg |
| 4,343,063 A | 8/1982 | Batt |
| 4,343,064 A | 8/1982 | van den Berg et al. |
| 4,348,782 A | 9/1982 | Fournier |
| 4,354,293 A | 10/1982 | Le Sausse et al. |
| 4,366,625 A | 1/1983 | Gehmann |
| D268,020 S | 2/1983 | Duvoux |
| 4,370,775 A | 2/1983 | van den Berg et al. |
| 4,389,746 A | 6/1983 | Kimber |
| 4,429,431 A | 2/1984 | Graczyk |
| 4,443,907 A | 4/1984 | Chamberlain |
| 4,445,249 A | 5/1984 | Harbison et al. |
| 4,473,919 A | 10/1984 | Fritz, Jr. |
| 4,587,686 A | 5/1986 | Thompson |
| 4,608,728 A | 9/1986 | Sumins et al. |
| 4,622,712 A | 11/1986 | Sugita et al. |
| 4,649,591 A | 3/1987 | Guerard |
| 4,670,934 A | 6/1987 | Epple et al. |
| 4,698,873 A | 10/1987 | Aoki et al. |
| D296,317 S | 6/1988 | Mower et al. |
| 4,766,636 A | 8/1988 | Shinpo |
| 4,802,257 A | 2/1989 | Edele et al. |
| 4,807,326 A | 2/1989 | Arai et al. |
| 4,878,263 A | 11/1989 | Raymond |
| 4,949,422 A | 8/1990 | Bauer et al. |
| 4,951,343 A | 8/1990 | Scorsiroli |
| 4,967,438 A | 11/1990 | Arai et al. |
| 5,007,131 A | 4/1991 | Chevalier et al. |
| 5,050,263 A | 9/1991 | Charng |
| 5,065,474 A | 11/1991 | Charng |
| 5,084,933 A | 2/1992 | Buechele |
| 5,168,597 A | 12/1992 | Schön et al. |
| 5,231,730 A * | 8/1993 | Schmid et al. ......... 15/250.452 |
| D341,561 S | 11/1993 | Heckman et al. |
| 5,289,608 A | 3/1994 | Kim |
| 5,319,826 A | 6/1994 | Mower |
| 5,325,564 A | 7/1994 | Swanepoel |
| 5,332,328 A | 7/1994 | Yang |
| D353,358 S | 12/1994 | Lee |
| D353,359 S | 12/1994 | Lee |
| 5,383,249 A | 1/1995 | Yang |
| 5,392,487 A | 2/1995 | Yang |
| 5,392,489 A | 2/1995 | Mohnach |
| D357,891 S | 5/1995 | Lee |
| 5,412,834 A * | 5/1995 | Burkard et al. ........ 15/250.452 |
| 5,462,707 A | 10/1995 | Nagy |
| 5,485,650 A | 1/1996 | Swanepoel |
| 5,509,166 A | 4/1996 | Wagner et al. |
| 5,546,627 A | 8/1996 | Chen |
| 5,606,765 A | 3/1997 | Ding |
| 5,611,103 A | 3/1997 | Lee |
| 5,618,124 A | 4/1997 | Chen |
| 5,632,059 A | 5/1997 | Lee |
| 5,661,871 A | 9/1997 | Scorsiroli |
| D392,612 S | 3/1998 | Jonasson et al. |
| 5,724,699 A | 3/1998 | Bexten |
| 5,724,700 A | 3/1998 | Marks |
| 5,746,534 A | 5/1998 | Hara |
| 5,768,739 A | 6/1998 | Iso |
| D395,864 S | 7/1998 | Stahlhut et al. |
| D395,865 S | 7/1998 | Powell et al. |
| 5,802,663 A * | 9/1998 | Criel .................... 15/250.452 |
| 5,807,016 A | 9/1998 | Herring et al. |
| D404,354 S | 1/1999 | Witek et al. |
| 5,875,672 A | 3/1999 | Fourie et al. |
| D410,889 S | 6/1999 | Lee |
| D411,503 S | 6/1999 | Lee |
| 5,937,474 A | 8/1999 | Hussaini |
| 5,970,569 A | 10/1999 | Merkel et al. |
| 6,000,093 A | 12/1999 | Charng |
| D418,474 S | 1/2000 | Witek et al. |
| 6,055,697 A | 5/2000 | Wollenschlaeger |
| 6,088,872 A | 7/2000 | Schmid et al. |
| D430,097 S | 8/2000 | Breesch et al. |
| 6,108,857 A | 8/2000 | Lee |

| | | |
|---|---|---|
| 6,112,365 A | 9/2000 | Ullrich et al. |
| 6,158,078 A | 12/2000 | Kotlarski |
| 6,161,249 A | 12/2000 | Hussaini |
| 6,163,922 A | 12/2000 | Fisher et al. |
| 6,226,829 B1 | 5/2001 | Kotlarski |
| D443,582 S | 6/2001 | De Block |
| D443,854 S | 6/2001 | De Block |
| D444,760 S | 7/2001 | Houssat et al. |
| 6,253,411 B1 | 7/2001 | Aichele et al. |
| 6,263,538 B1 | 7/2001 | Westermann et al. |
| 6,279,191 B1 | 8/2001 | Kotlarski et al. |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,741 B1 | 10/2001 | Westermann et al. |
| 6,308,373 B1 | 10/2001 | Merkel et al. |
| 6,314,608 B1 | 11/2001 | Fisher et al. |
| 6,332,236 B1 | 12/2001 | Ku |
| 6,363,569 B1 | 4/2002 | Kotlarski |
| D457,479 S | 5/2002 | De Block et al. |
| 6,397,428 B2 | 6/2002 | Kotlarski |
| 6,401,292 B1 | 6/2002 | Leutsch |
| 6,427,282 B1 | 8/2002 | Kotlarski |
| 6,427,283 B1 | 8/2002 | Dietrich et al. |
| 6,449,797 B1 | 9/2002 | De Block |
| 6,481,044 B1 | 11/2002 | Journee |
| 6,499,181 B1 | 12/2002 | Kotlarski |
| 6,516,491 B2 | 2/2003 | Merkel et al. |
| 6,523,218 B1 | 2/2003 | Kotlarski |
| 6,532,638 B2 | 3/2003 | Wilhelm et al. |
| 6,539,576 B2 | 4/2003 | Kim |
| 6,550,096 B1 | 4/2003 | Stewart et al. |
| 6,581,237 B1 | 6/2003 | Kotlarski |
| 6,591,445 B2 | 7/2003 | Nacamuli |
| 6,598,258 B2 | 7/2003 | Lee |
| D478,308 S | 8/2003 | Lee |
| D480,679 S | 10/2003 | Lee |
| 6,640,380 B2 | 11/2003 | Rosenstein et al. |
| 6,651,292 B2 | 11/2003 | Komerska |
| 6,658,690 B1 | 12/2003 | Westermann et al. |
| 6,675,432 B1 | 1/2004 | De Block |
| 6,675,433 B1 | 1/2004 | Stewart et al. |
| 2001/0004783 A1 | 6/2001 | Kotlarski |
| 2001/0008034 A1 | 7/2001 | Merkel et al. |
| 2002/0000018 A1 | 1/2002 | Kotlarski et al. |
| 2002/0026681 A1 | 3/2002 | Nacamuli |
| 2002/0174504 A1 | 11/2002 | Kim |
| 2002/0174505 A1 | 11/2002 | Kim |
| 2003/0066153 A1 | 4/2003 | Rosenstein et al. |
| 2003/0074763 A1 | 4/2003 | Egner-Walter et al. |
| 2003/0213089 A1 | 11/2003 | Merkel et al. |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0098821 A1* | 5/2004 | Kraemer et al. ....... 15/250.201 |

FOREIGN PATENT DOCUMENTS

| | | |
|---|---|---|
| CA | 1000911 | 12/1976 |
| EP | 0 316 114 | 11/1993 |
| EP | 0 591 063 | 11/1996 |
| GB | 1 429 820 | 3/1976 |
| WO | WO 98/04443 | 2/1998 |
| WO | WO 98/19899 | 5/1998 |

* cited by examiner

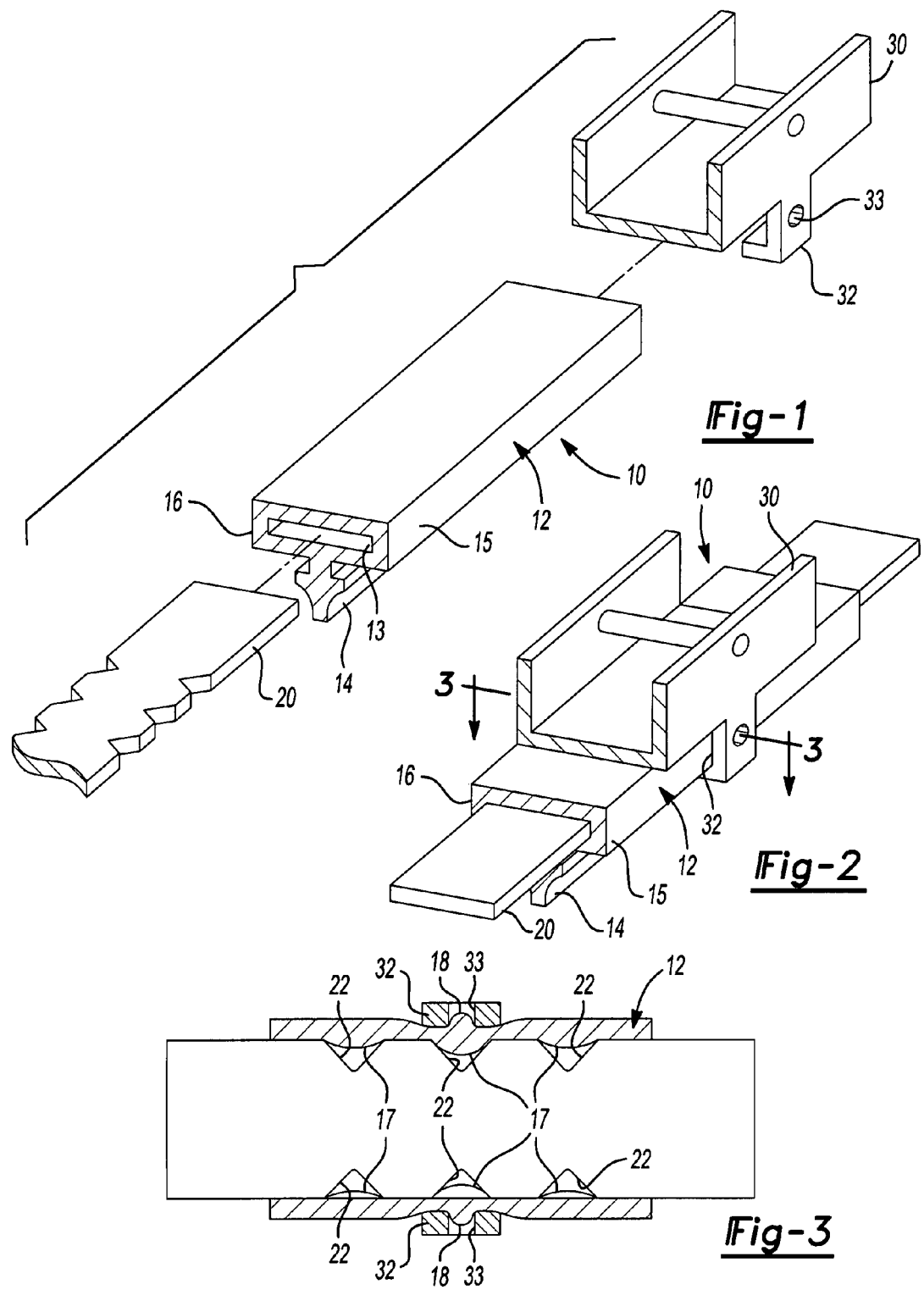

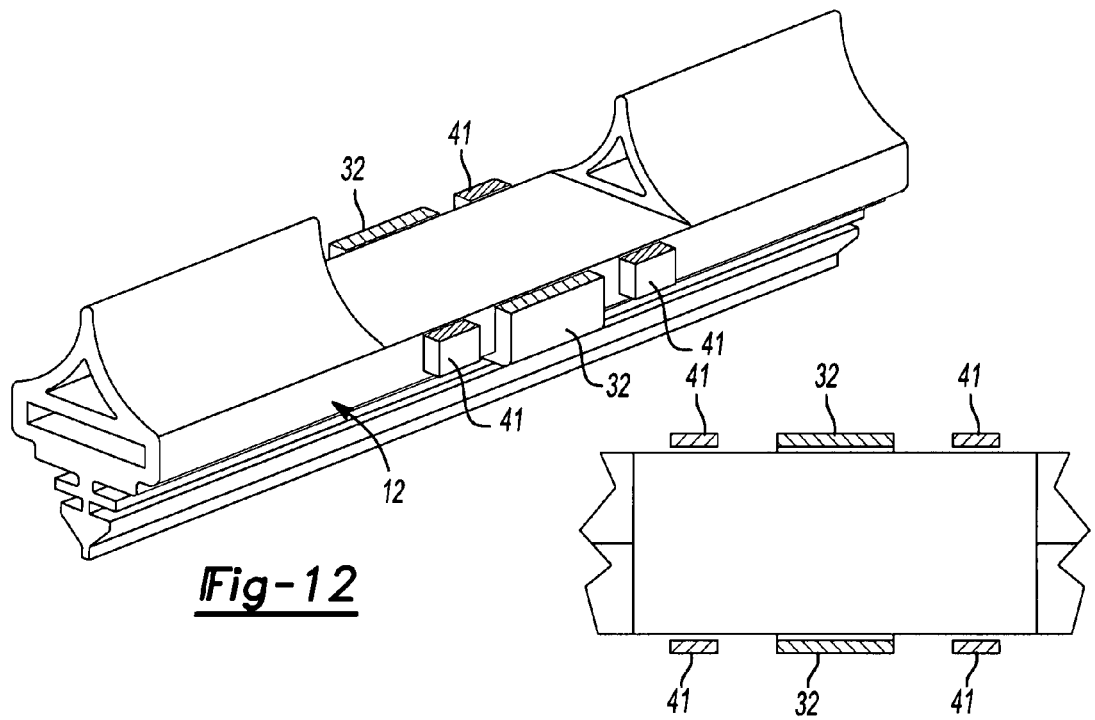
Fig-12
Fig-13
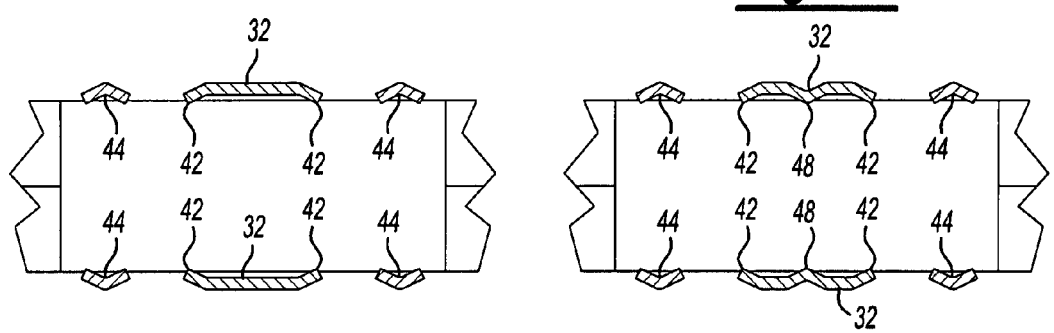
Fig-14
Fig-15
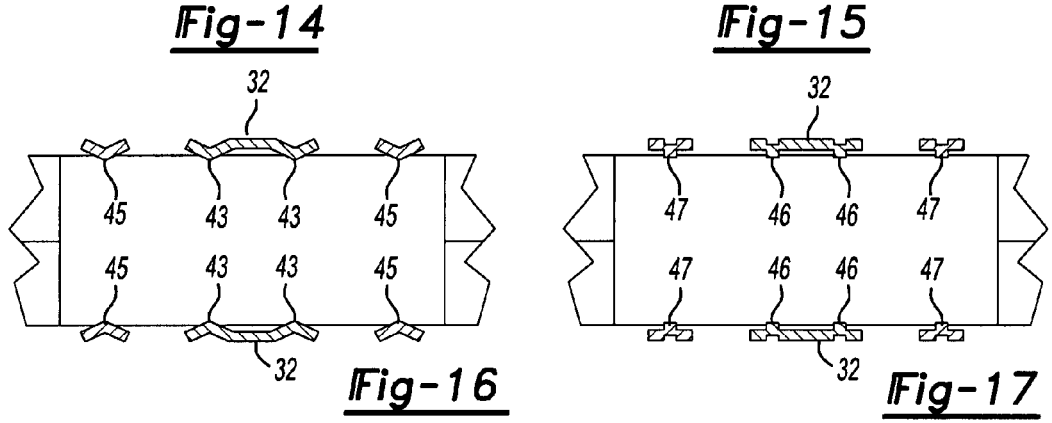
Fig-16
Fig-17

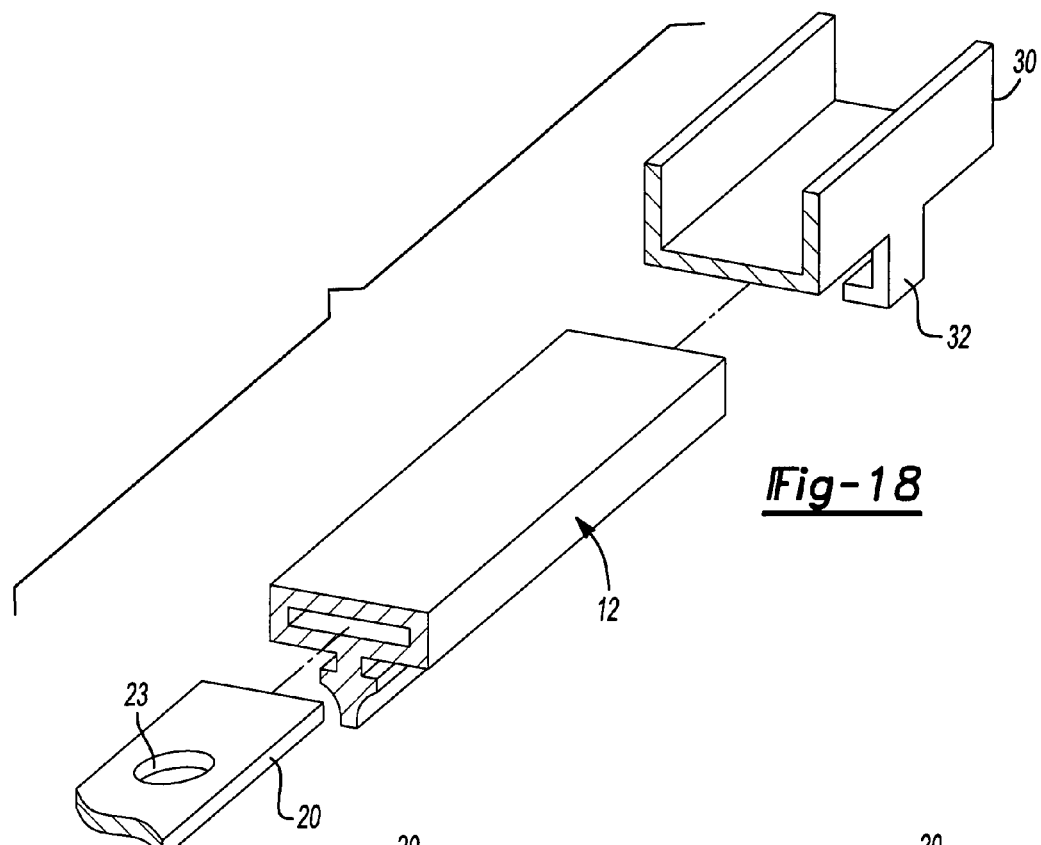
*Fig-18*
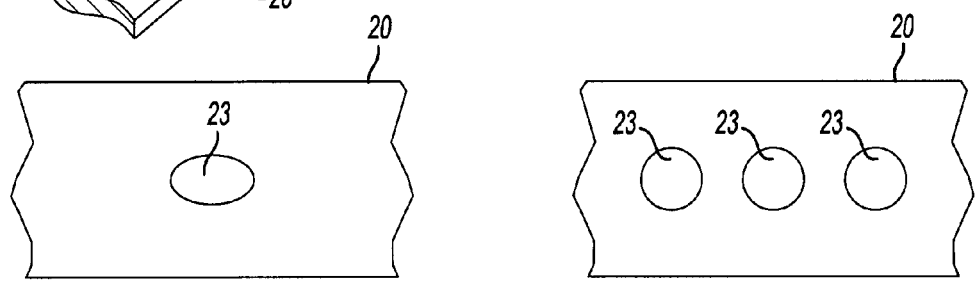
*Fig-19*     *Fig-20*
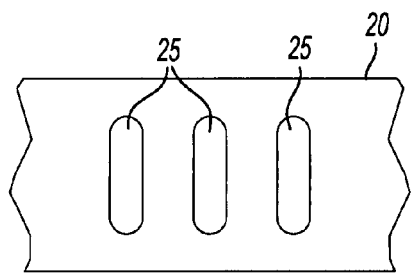
*Fig-21*     *Fig-22*

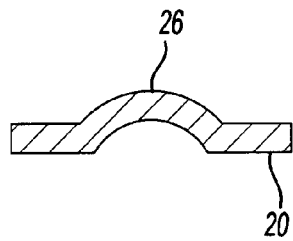
*Fig-25*
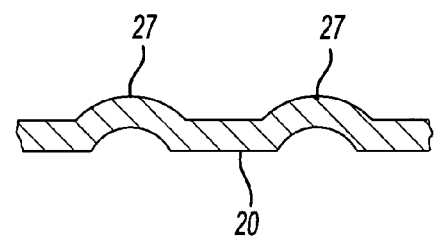
*Fig-26*
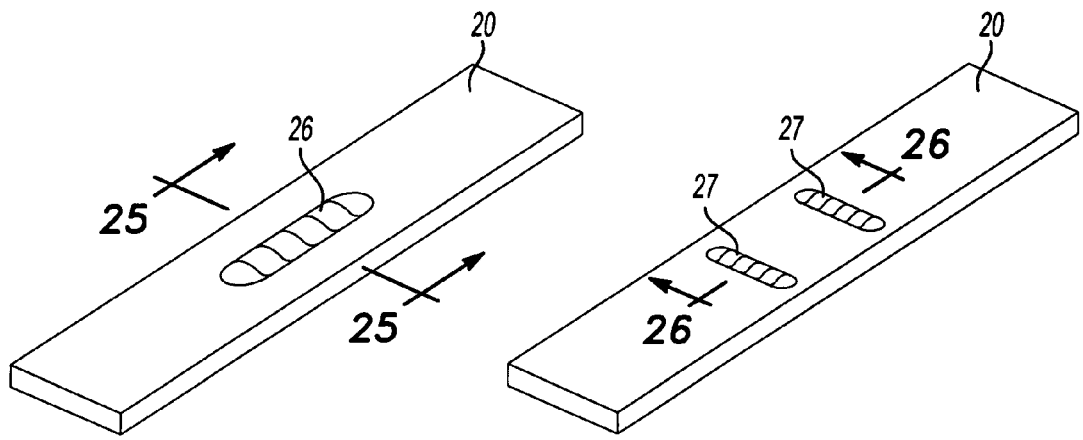
*Fig-27*          *Fig-28*
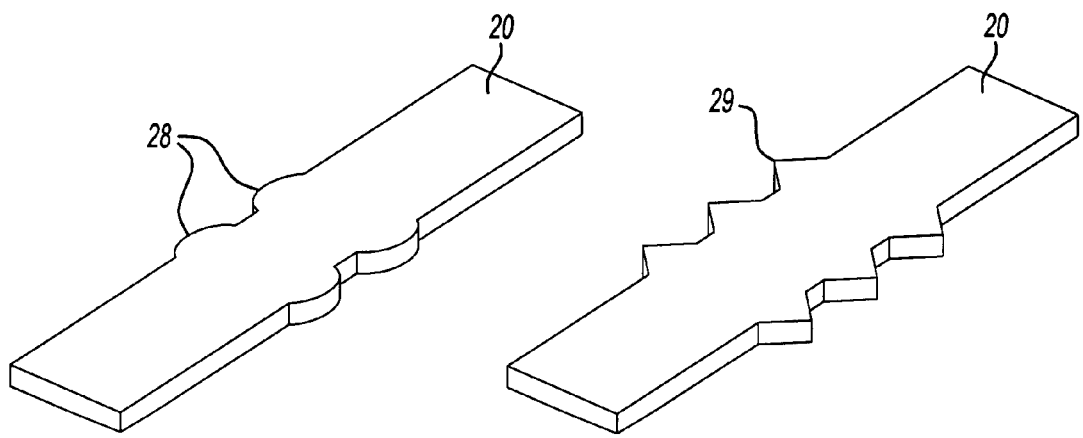
*Fig-29*          *Fig-30*

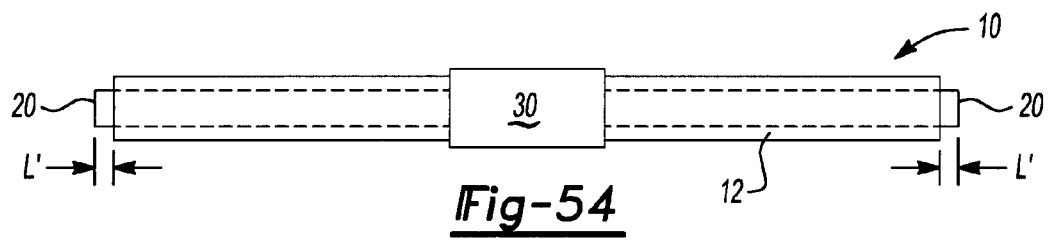
*Fig-54*
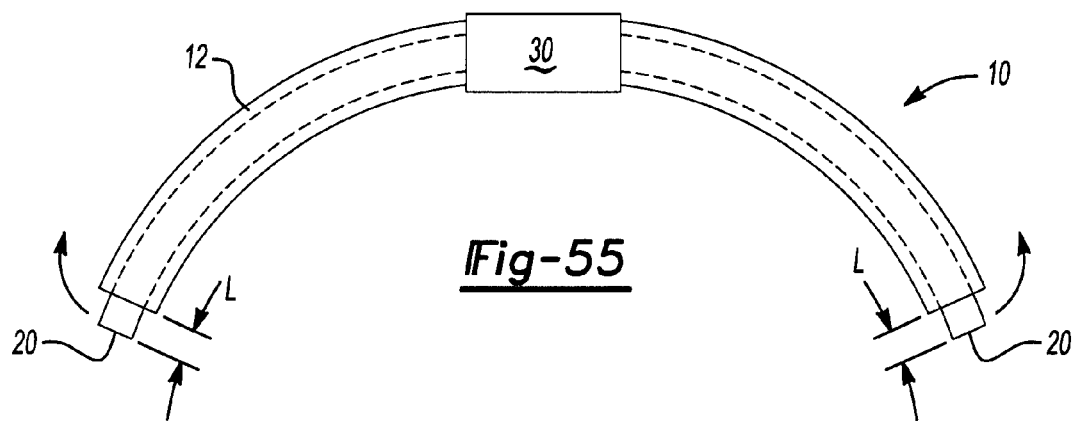
*Fig-55*
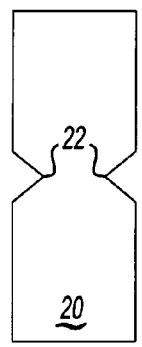 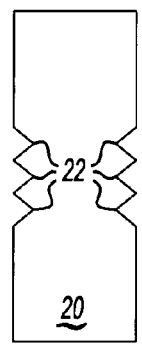 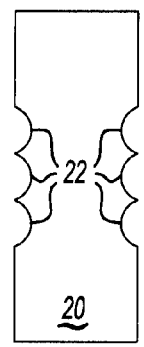
*Fig-56*  *Fig-57*  *Fig-58*
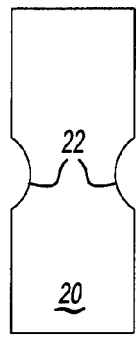 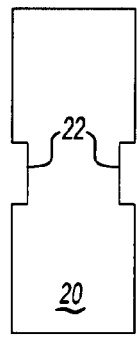 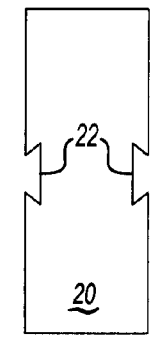
*Fig-59*  *Fig-60*  *Fig-61*

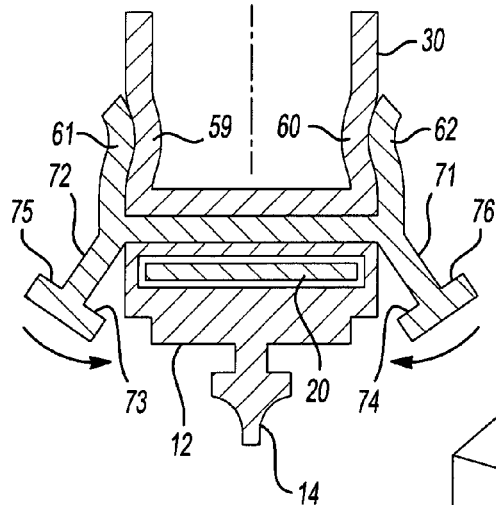
Fig-87
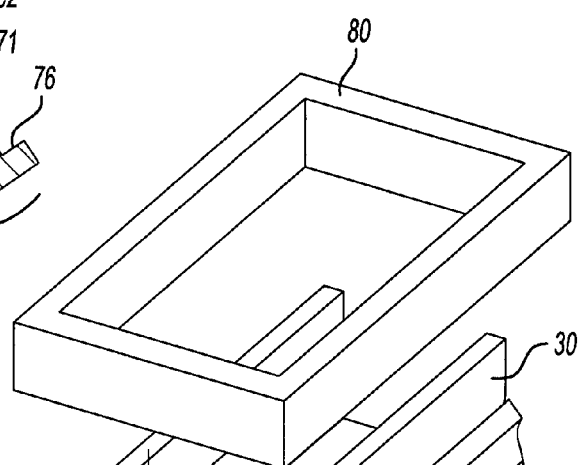
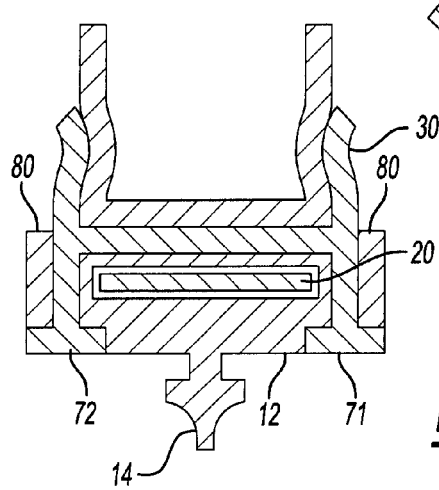
Fig-88
Fig-89

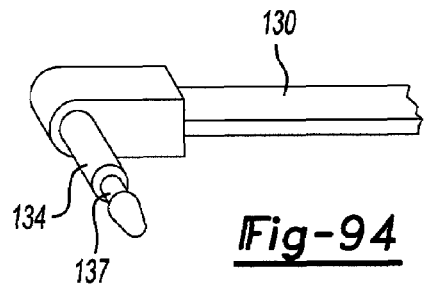
*Fig-94*
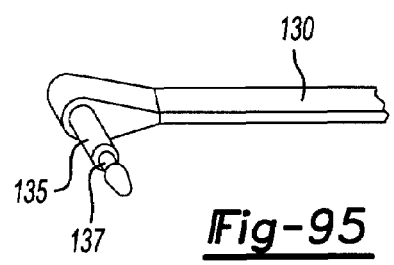
*Fig-95*
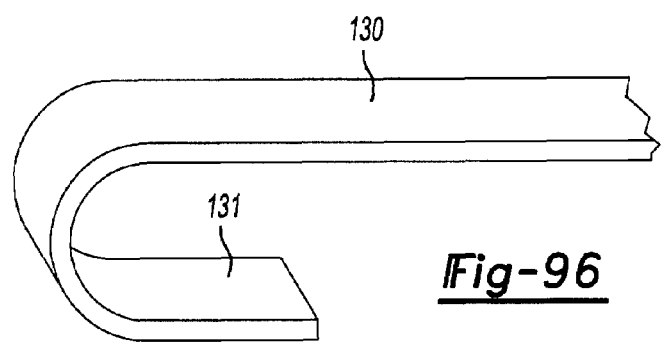
*Fig-96*
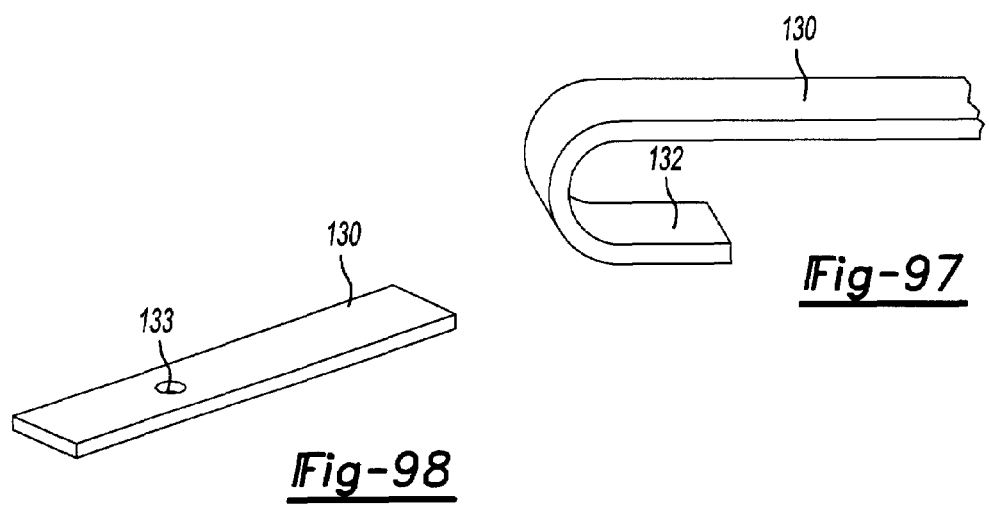
*Fig-97*
*Fig-98*

RELATIVE AXIAL TRANSLATION PREVENTION SYSTEM FOR WIPER BLADE ASSEMBLIES

FIELD OF THE INVENTION

The present invention relates to windshield wiping blade assemblies. More particularly, this invention relates to the connector means of attaching a windshield wiping blade assembly to a wiper arm, minimizing or preventing relative axial translation thereto.

BACKGROUND OF THE INVENTION

A frequently encountered shortcoming in the design of conventional automotive windshield wipers is observed in that various automobile manufacturers utilize various windshield wiper arms. Some of the more frequently used designs comprise wiper arms which have a hook end, flat end or bayonet style, or lateral side pin. Each of these varying styles of windshield wiper arms generally requires a different adapter for attaching the wiper arm to a wiper blade assembly.

These connectors frequently come in the package when a consumer purchases a windshield wiper, and it is often difficult for the consumer to discern how to use and how to attach the various adapters. Many times, loose pieces can be lost and wrong pieces used to install the wiper, which can hinder the performance of the wiper blade.

Additionally, the connectors on the windshield wiper blades, which receive the various wiper arm adapters, are slipped on, spot welded, or riveted to the support beam of the wiper blade. The use of these methods of attachment can cause the connector to slip off or break loose under severe circumstances, allowing tangential disassembly of the wiper blade assembly and possible damage to the windshield of the vehicle. Furthermore, this type of design requires intimate or direct contact between the connector and the wiper support beam. The current attachment means do not provide an option for attachment with a resilient medium between the connector and the beam, which would prolong the life of the blade assembly. Additionally, separate connection means are often necessary to prevent relative translation between the wiper beam and the wiper blade, as well as between the wiper blade and the wiper arm connector. Current methods do not provide one means to accomplish both objectives.

SUMMARY OF THE INVENTION

It is therefore proposed herein that an object of the present invention is to provide a windshield wiper having an encapsulated beam for providing structure and uniform support for the wiper blade throughout its various oscillations.

A further object of the present invention is to provide a wiper blade having an encapsulated beam which prevents the rotation and twisting of the resilient wiper blade around the support beam.

It is another object of the present invention to provide a wiper blade having an encapsulated beam which prevents the axial translation of the resilient wiper blade along the support beam.

Another object of the present invention is to provide a wiper blade having the encapsulated beam detachably attachable as a unit to a wiper arm connector element.

Another object of the present invention is to provide a wiper beam having a construction whereas the beam is isolated from the windshield wiper connector system while still preventing the rotation/translation of the resilient portion relative to the beam.

Another object of the present invention is to provide a universal wiper arm connector for attaching the windshield wiper to a plurality of different wiper arms.

Another object of the present invention is to provide a shrouded windshield wiper connector and collar which provides a smooth transition between a wind deflector or airfoil portion of a windshield wiper and the connector element.

Finally, it is an objective of the present invention to provide an easy-to-assemble, simple-to-manufacture universal windshield wiper assembly which is durable and economical to create.

These and other objects will become more apparent in the following detailed description describing a windshield wiper blade assembly comprising a resilient wiper blade having an axial passage through which a semi-flexible support beam is positioned to provide structure. A universal connector element, for connecting the blade assembly to a plurality of different wiper arms, crimps onto the blade and support beam assembly approximately midway along the wiper blade in a manner which does not puncture or interfere with the resilient windshield wiper material, while at the same time preventing the relative axial translation of the support beam within the windshield wiper blade as well as translation between the blade and the connector itself.

BRIEF DESCRIPTION OF THE DRAWINGS

The present invention will become more fully understood from the detailed description and the accompanying drawings, wherein:

FIG. 1 illustrates a partial perspective exploded view of a first embodiment of a windshield wiper beam assembly;

FIG. 2 illustrates a partial perspective assembled view of the embodiment shown in FIG. 1;

FIG. 3 illustrates a cross-sectional view of the embodiment of FIG. 1A;

FIG. 12 illustrates a partial perspective view of an alternative embodiment of the assembly shown in FIG. 1;

FIGS. 13 through 17 illustrate cross-sectional top views of alternative embodiments for the crimping tabs of the connector element shown in FIG. 12;

FIG. 18 illustrates a partial perspective exploded view of a windshield wiper beam assembly having a perforated beam;

FIGS. 19 through 22 illustrate partial overhead views of alternative embodiments for the beam illustrated in FIG. 18;

FIGS. 25 and 26 illustrate cross-sectional views of alternative embodiments for the wiper beam of 18;

FIGS. 27 and 28 illustrate partial perspective views of the embodiments of FIGS. 25 and 26, respectively;

FIGS. 29 and 30 illustrate partial perspective views of alternative embodiments of the windshield wiper beam of FIG. 18;

FIGS. 54 and 55 illustrate partial perspective side views of the wiper blade assembly of the preferred embodiment in a flat and arcuate disposition, respectively;

FIGS. 56 through 61 illustrate partial overhead views of alternative embodiments to wiper blade support beams of the present invention;

FIG. 87 is a cross-sectional, pre-assembly end view of a further embodiment of the present invention;

FIG. 88 is a partial perspective preassembly view of the embodiment shown in FIG. 87;

FIG. 89 is a cross-sectional, assembled end view of the embodiment shown in FIG. 87;

FIGS. 94 through 98 are partial perspective views of a plurality of windshield wiper arms known in the art;

DETAILED DESCRIPTION OF THE PREFERRED EMBODIMENTS

Figure 4:
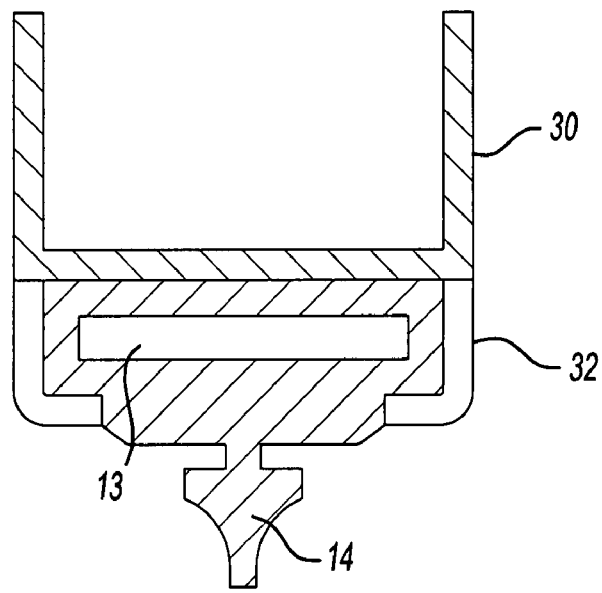
FIG. 4 illustrates a cross-sectional end view of the embodiment of FIG. 1.

The following description of the preferred embodiments is merely exemplary in nature and is in no way intended to limit the invention, its application, or uses.

Referring now to the figures, particularly FIG. 1, a first embodiment of a windshield wiper assembly 10 is shown. Assembly 10 comprises an elongated, resilient wiping blade 12 having a flexible windshield wiping element 14 and a longitudinal beam-receiving passage 13 therethrough for accepting a support beam 20 therewithin. Support beam 20 is retained within wiping blade 12 by a releasable connector element 30 which secures the assembly by one or more paired crimping tabs 32 shown with additional securing apertures 33.

Figure 5:
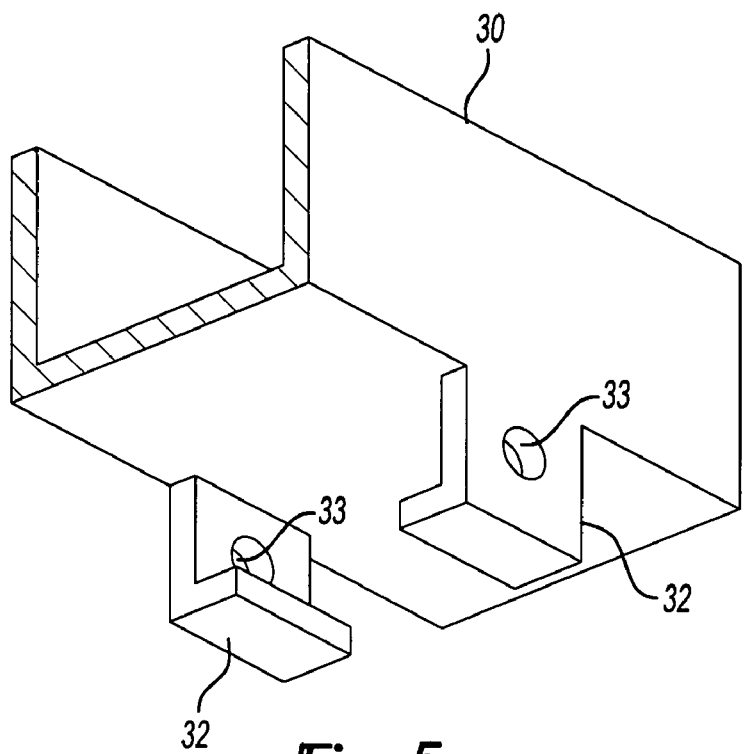
FIG. 5 illustrates an additional perspective view of the connector element shown in FIG. 1.
Figure 6:
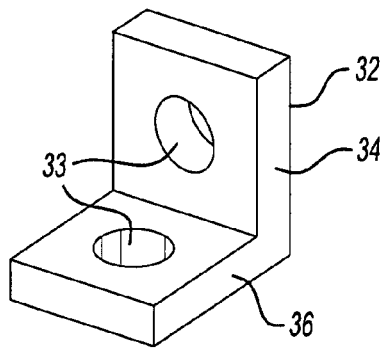
FIGS. 6 through 11 illustrate partial perspective views of alternative embodiments for the crimping tabs of the connector element shown in FIG. 5.
Figure 7:
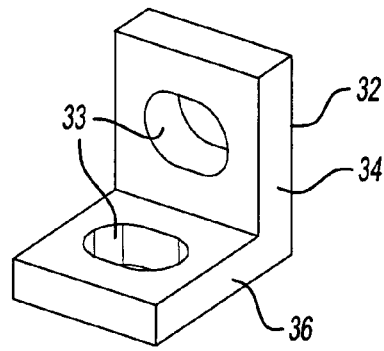
Figure 8:
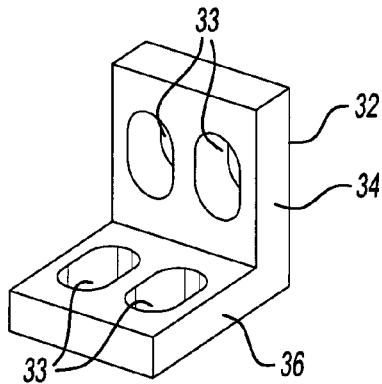

FIGS. 2 and 3 illustrate the wiper assembly 10 of FIG. 4 wherein wiping blade 12, support beam 20, and connector element 30 are assembled together, showing the support beam positioned within the resilient wiping blade 12 and secured by crimping tabs 32, which wrap around the edges 15, 16 of blade 12, clamping beam 20 therebetween. FIG. 3, illustrating a cross-sectional overhead view of FIG. 2 taken in the direction of arrows 3-3 of FIG. 2, further shows the assembly interface between connector 30, wiping blade 12, and support beam 20. Support beam 20, shown in this embodiment, has a plurality of lateral serrations 22 which assist in securing beam 20 within blade 12. When crimping tabs 32 are crimped around the assembly of blade 12 and beam 20, a portion of the resilient material of blade 12 flows/bulges inward to form an inward bulge 17 proximal these serrations, preventing axial translation of wiping blade 12 relative to support beam 20 at the connector location. Furthermore, outward bulges 18 of the resilient blade material form within apertures 33 of crimping tabs 32 upon the crimping of the tabs around the assembly, preventing relative axial translation between the connector element 30 and wiping blade 12. FIGS. 4 and 5 further illustrate connector element 30 as a cross-sectional view in conjunction with wiping blade 12 and as an isolated illustration, respectively, for clarification purposes.

Referring now to FIGS. 6 through 11, alternative embodiments of crimping tabs 32 of connector element 30 are shown. Particularly, the scope of the present invention is intended to cover resilient bulge receiving apertures 33 in any number, shape, or combination, both on the lateral portion 34 and the supporting lower portion 36 of crimping tabs 32. These apertures can be of oval, round, or triangular shape, for example, and all contribute to the ability of assembly 10 to prevent lateral translation between the connector and wiper blade.

Figure 9:
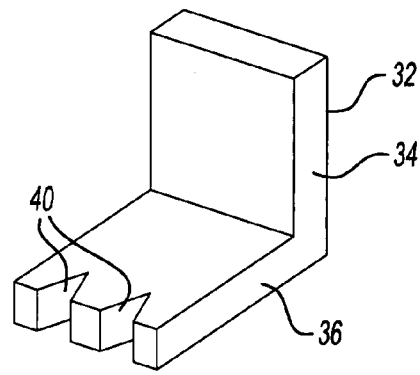
Figure 10:
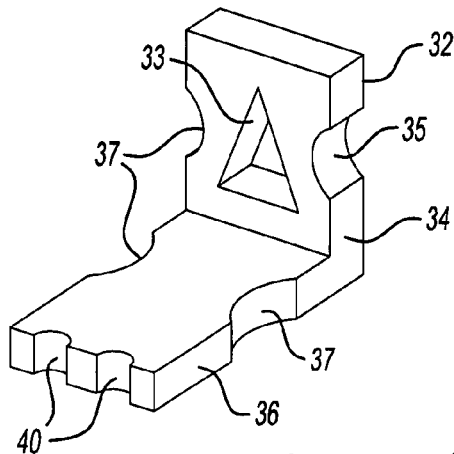
Figure 11:
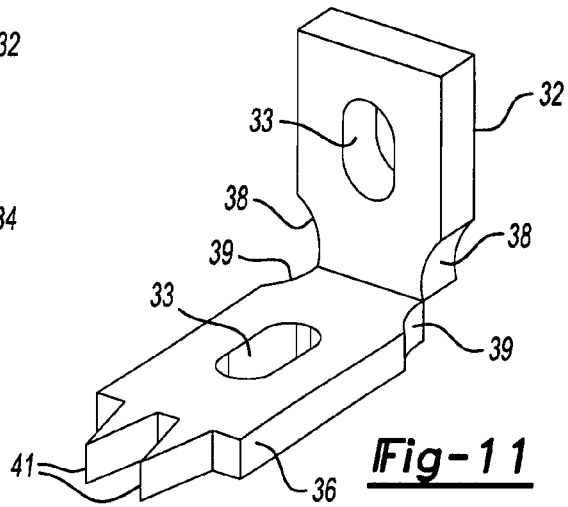

FIGS. 9 and 10 illustrate an even further means of blade retention by implementing one or more serrations 37, 40 in lower portion 36 of crimping tabs 32 within which additional portions of the resilient blade material are deflected during assembly. FIG. 11 illustrates an alternative design in which one or more teeth 41 extend inward from the lower portion of crimping tab 32, between which deflected blade material is received when the assembly is crimped together. Optionally, concave portions 38, 39 within lateral portion 34 and lower portion 36 of tab 32 are shown, respectively, at the junction therebetween, further carrying out the objective of retaining the blade element within connector 30.

Referring now to FIGS. 12 through 17, alternative embodiments to the crimping tabs 32 of connector 30 are shown. FIG. 12 illustrates crimping tabs 32 of connector element 30 in conjunction with one or more pairs of lateral stabilizer tabs 41, which are also formed within connector element 30. These tabs may be present in any number of shapes and add to the overall support of the assembly in controlling the lateral play between wiping blade 12 and connector 30, while further providing additional frictional force to aid in preventing relative translation between the blade and connector elements, as well. As shown in these figures, tabs 32, 41 may comprise any number or combination of inward deflections 43, 45, and 48, outward deflections 42, 44, or stamped protrusions 46, 47.

Additional means of preventing the relative translation between support beam 20 and wiping blade 12 are shown in FIGS. 18 through 22. The retaining means are similar to those discussed above for retaining blade element 20 within connector 30, wherein the support beam comprises one or more apertures 23 positioned on beam 20 approximately midway so as to be located at connector 30 when assembled. These aperture(s) 23 partially receive a deflected portion of resilient wiper blade 12 material when connector 30 is crimped around the blade and beam assembly, frictionally holding beam 20 in position within blade 12 at the position of connector element 30. As shown in FIGS. 19 through 22, these apertures 23, 24, and 25 can be of any shape, size, or orientation on the support beam 30.

Figure 23:
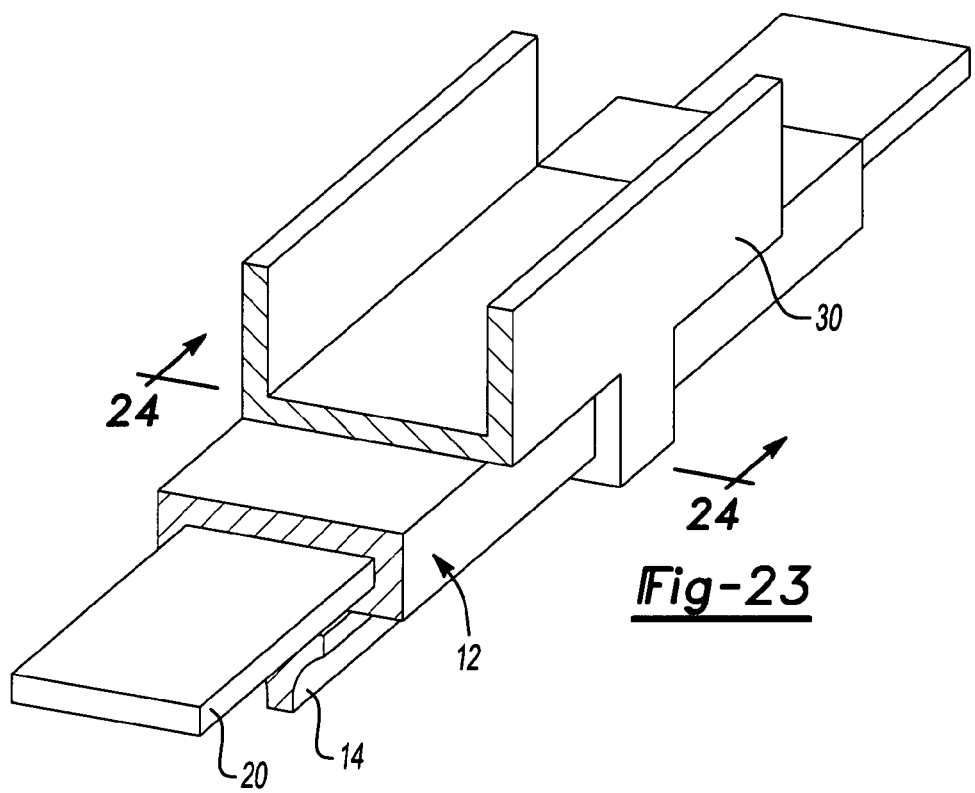
FIG. 23 illustrates a partial perspective assembled view of the embodiment shown in FIG. 18.
Figure 24:
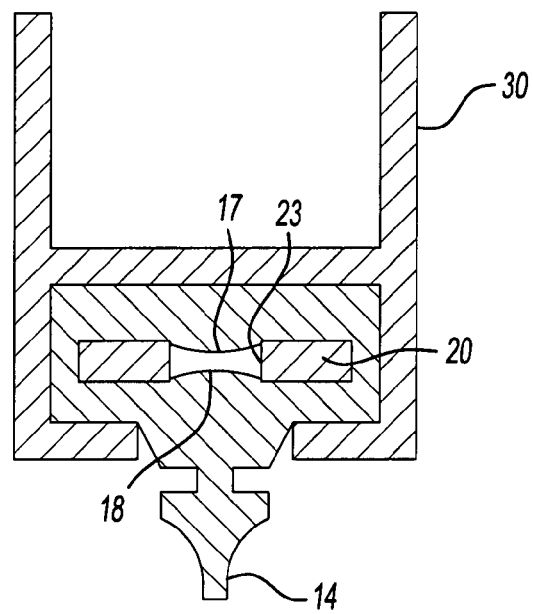
FIG. 24 illustrates a cross-sectional view of the embodiment shown in FIG. 23.

FIGS. 23 and 24 further illustrate this element of the present invention, wherein FIG. 24 is a cross-sectional view taken in the direction of arrows 24-24 of FIG. 23. Connector 30 is shown crimped around blade 12, and support beam 20 is shown having aperture 23 therethrough, receiving deflected portions 17, 18 of wiper blade 12 for frictionally securing blade 12 to support beam 20. Referring to FIGS. 25 through 30, further embodiments of support beam 20 are shown. In particular, FIGS. 27 and 28 show support beam 20 with a single, longitudinal raised impression 26, or a plurality of latitudinal raised impressions 27. This is best illustrated in cross-sectional views 25 and 26 taken in the direction of arrows 25-25 and 26-26 of FIGS. 27 and 28, respectively. These impressions further act to frictionally hold the longitudinal position of the support beam 20 within the wiper element 12.

Alternatively, as shown in FIGS., 29 and 30, lateral protrusions 28, 29 can be utilized in any number combination or orientation to achieve the same frictional retention. The number, shape, and orientation of both impressions 26, 27, as well as the protrusions 28, 29, are intended to be within the scope of the present invention.

Figure 31:
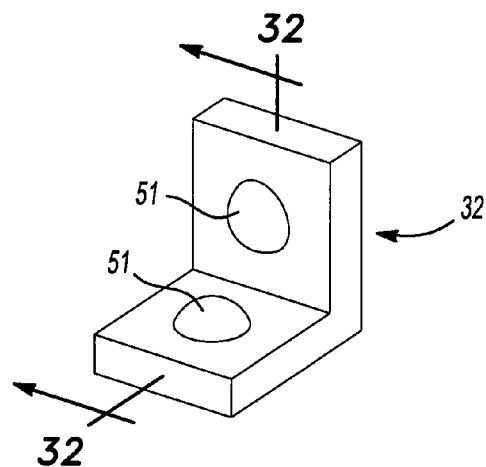
FIG. 31 illustrates a partial perspective view of a first embodiment of the crimping tab of the connector element shown in FIG. 18.
Figure 32:
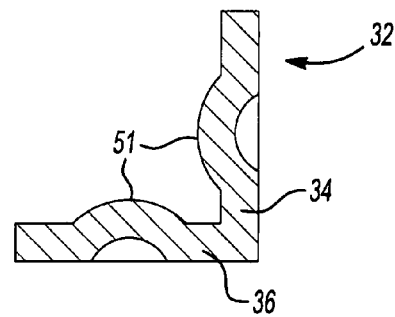
FIG. 32 is a cross-sectional view of FIG. 31.
Figure 33:
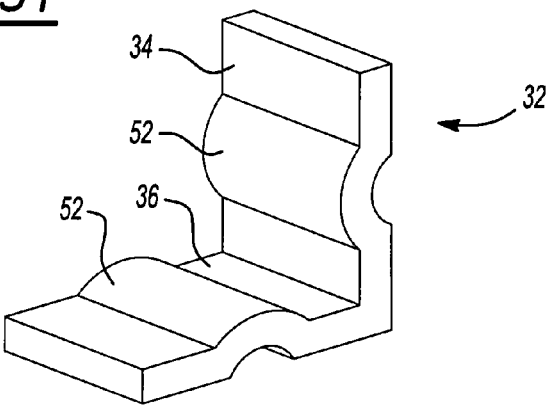
FIGS. 33 and 34 are alternative embodiments of the crimping tab shown in FIGS. 31 and 32.
Figure 34:
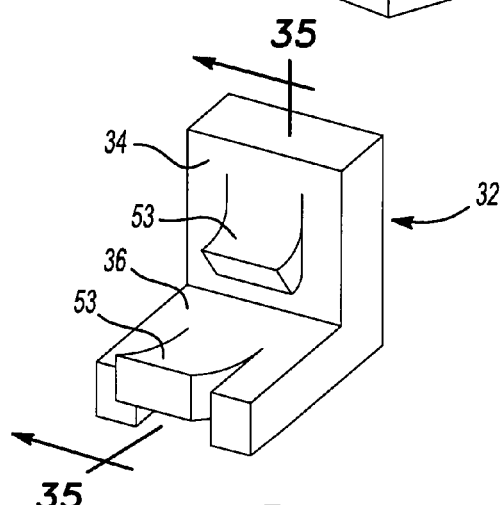
Figure 35:
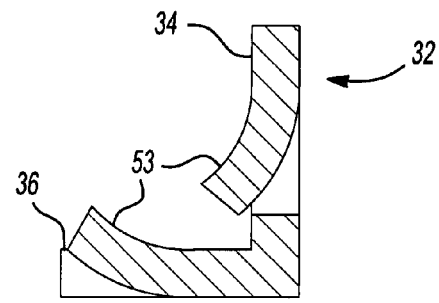
FIG. 35 illustrates a cross-sectional view of FIG. 34.

Referring now to FIGS. 31 through 35, a plurality of embodiments is shown for crimping tab 32. In particular, FIGS. 31 and 32 illustrate tabs 32 comprising a pair of raised dimples 51, both on lateral portion 34 and supporting lower portion 36 of crimping tabs 32. FIG. 33 shows a pair of parallel ridges 52, formed in the tabs, running axially to the windshield wiper blade. FIGS. 34 and 35 utilize a pair of inwardly deflected tabs 53. Though different in means, the function of each of these embodiments is to provide for the increased frictional gripping of the resilient blade material within the crimping tabs 32 when the connector element 30 is attached to the wiper blade assembly.

Figures 36, 37:
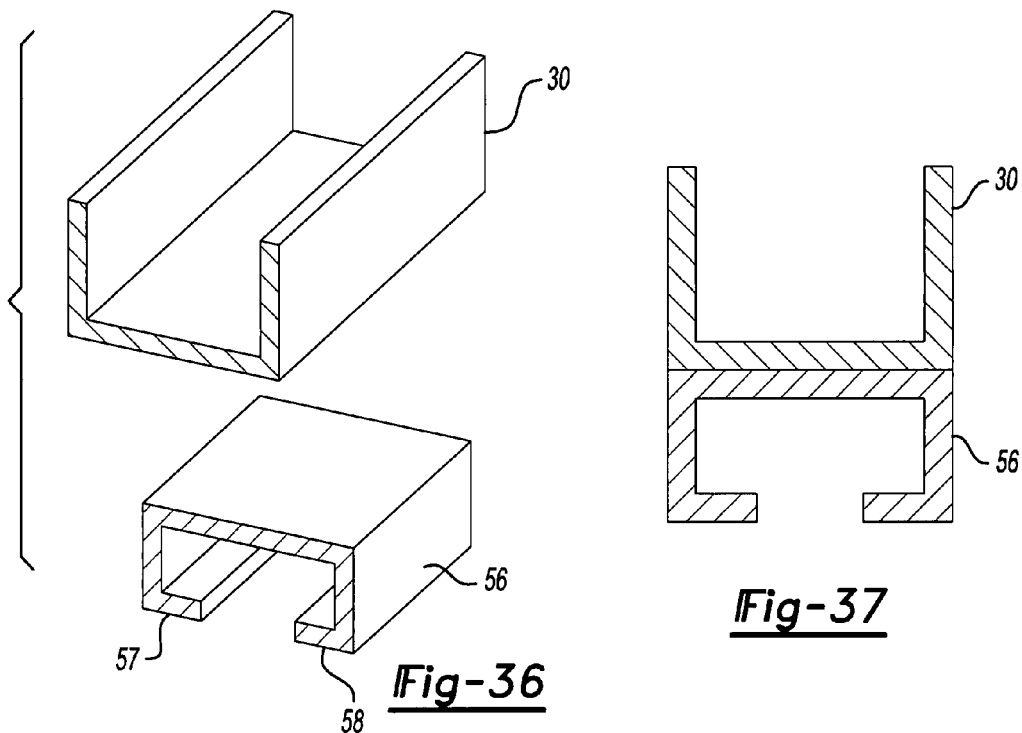
FIG. 36 illustrates a partial perspective view of an alternative embodiment to the connector element of FIG. 18.
FIG. 37 illustrates a cross-sectional view of the connector of FIG. 36.
Figures 38, 39:
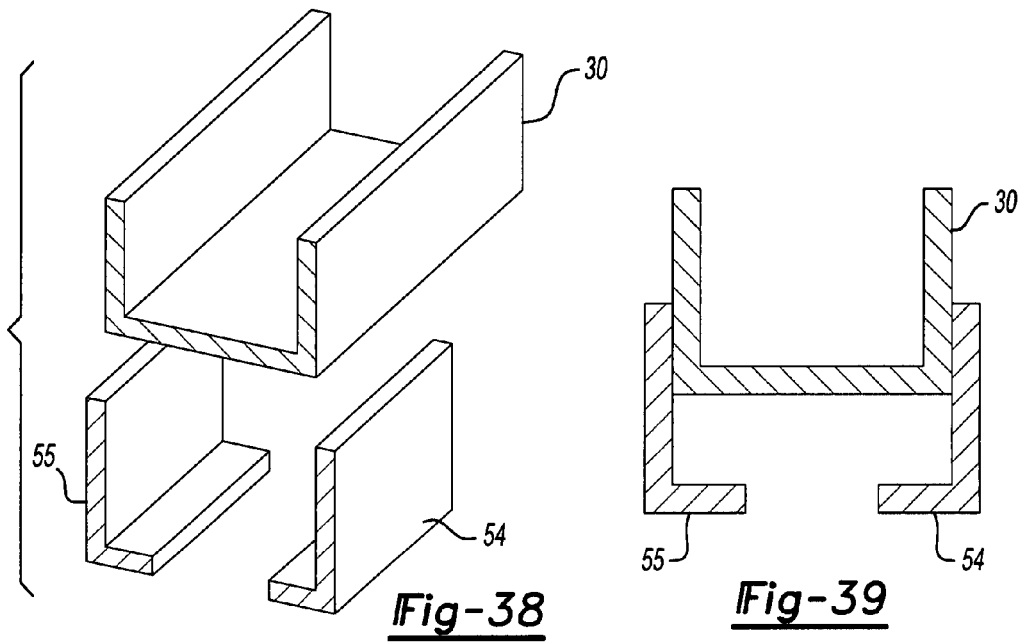
FIG. 38 illustrates a partial perspective view of an alternative embodiment to the connector element of FIG. 18.
FIG. 39 illustrates a cross-sectional view of the connector of FIG. 38.

FIGS. 36 through 39 illustrate alternative embodiments for connector element 30, wherein the means of attaching to the wiper blade comprise separate elements attachable to the connector element by a plurality of means, such as gluing, welding, bonding, or crimping, though not limited to these methods per se. In particular, FIGS. 36 and 37 illustrate the wiper blade attachment means as a U-shaped channel 56, having a pair of crimping tabs 57, 58, which frictionally grip the wiper blade as described herein above. Channel 56 is affixed to the bottom side of connector element 30. Alternatively, as shown in FIGS. 38 and 39, the wiper blade attachment means can comprise a pair of L-shaped tabs 54, 55 which also crimp onto the wiper blade element and are secured to the sides of connector element 30 by a plurality of permanent or releasable means.

Figure 40:
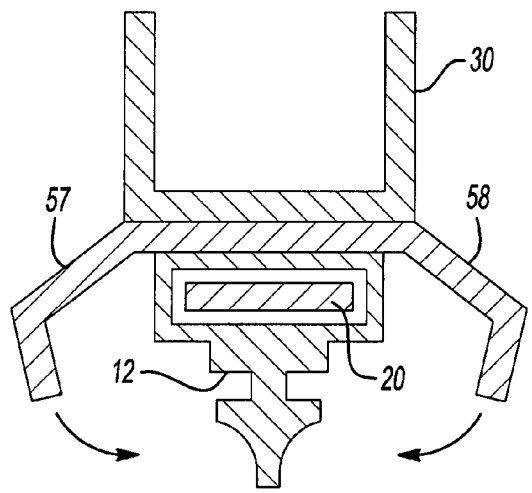
FIGS. 40 through 42 illustrate cross-sectional views of the connector of 18 showing crimping tabs in the open, intermediate, and fully-clamped orientations, respectively.
Figure 41:
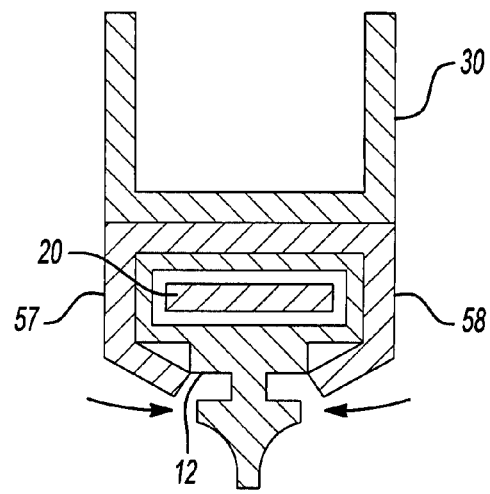
Figure 42:
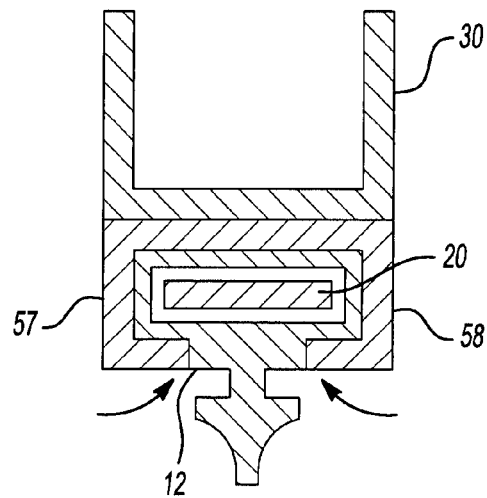

FIGS. 40 through 42 illustrate the crimping steps of the blade attachment means of FIG. 36. U-shaped channel 56 is affixed to the bottom of connector element 30 with crimping tabs 57, 58 initially in the outwardly deflected orientation. When wiper blade 12 with support beam 20 positioned therein is brought up within crimping tabs 57, 58, the tabs are biased inward, as shown by the arrows, to hold blade 12 and support beam securely there within.

Figure 43:
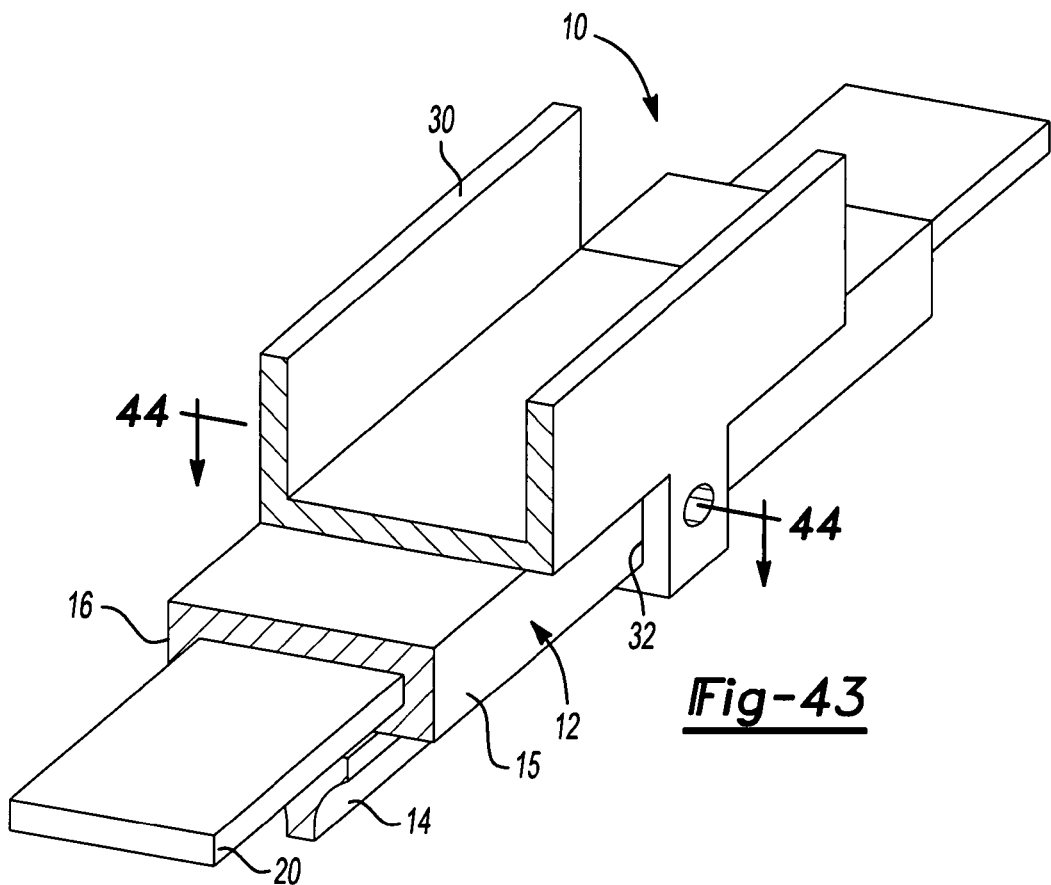
FIG. 43 illustrates a partial perspective view of an alternative embodiment of the windshield wiper connector assembly.
Figure 44:
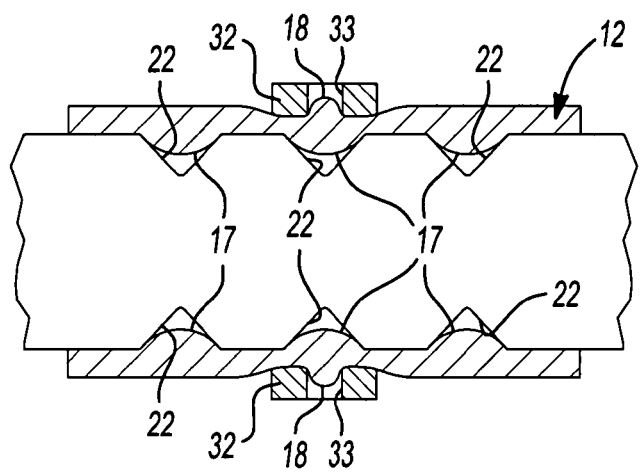
FIG. 44 illustrates a cross-sectional view of the wiper connector assembly of FIG. 43.

FIGS. 43 and 44 further illustrate wiper assembly 10 having a unitary connector element 30 and a serrated support beam 20. Wiping blade 12, support beam 20, and connector element 30 are assembled together, wherein support beam 20 is positioned within resilient wiping blade 12 and secured by crimping tabs 32 which wrap around edges 15, 16 of blade 12, clamping beam 20 therebetween without perforating the material of resilient blade 12. FIG. 44, illustrating a cross-sectional overhead view of FIG. 43 taken in the direction of arrows 44-44 of FIG. 43, further shows the assembly interface between connector 30, wiping blade 12, and support beam 20. Support beam 20, as shown in this embodiment, has a plurality of lateral serrations 22 which assist in securing beam 20 within blade 12. When crimping tabs 32 are crimped around the assembly of blade 12 and beam 20, a portion of the resilient material of blade 12 forms inward bulges 17 proximal these serrations, preventing axial translation of wiping blade 12 relative to support beam 20 at the connector location. Furthermore, outward bulges 18 of resilient material of blade 12 form within apertures 33 of crimping tabs 32, upon the crimping of the tabs around the assembly, preventing relative axial translation between connector element 30 and wiping blade 12.

Figures 45, 46:
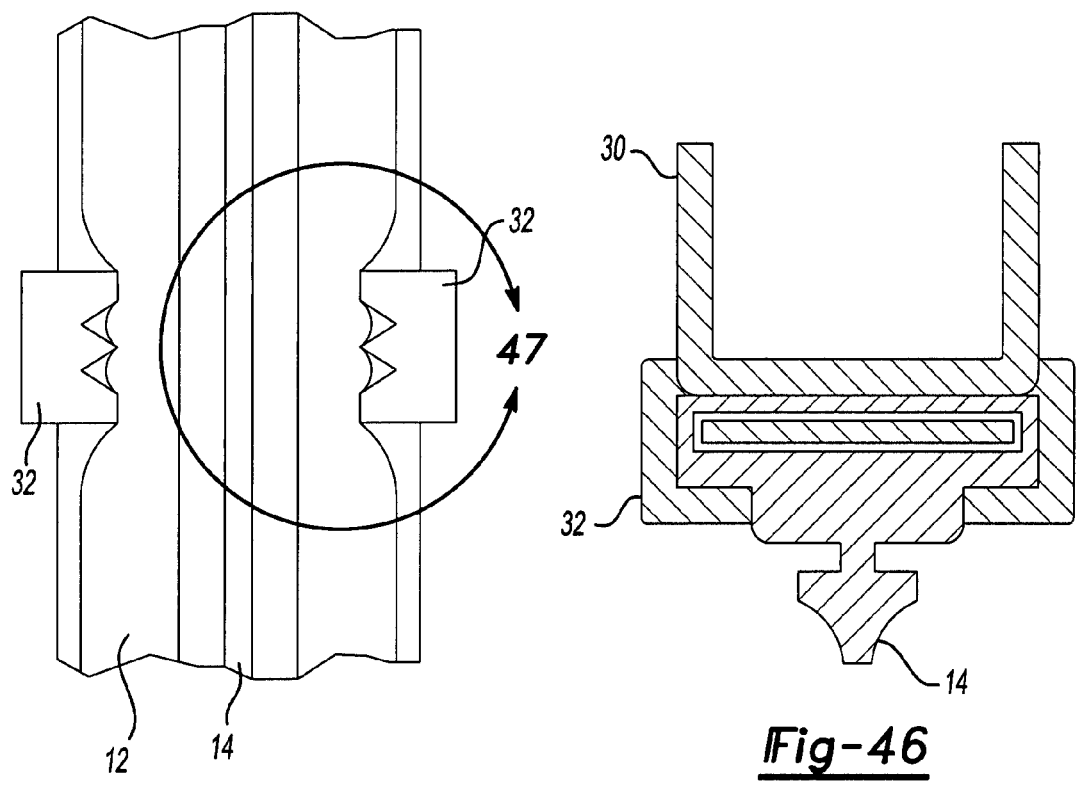
FIGS. 45 through 47 illustrate a bottom view, a close-up bottom view, and a cross-sectional end view, respectively, of an alternative embodiment of the connector and windshield wiper assembly.
Figure 47:
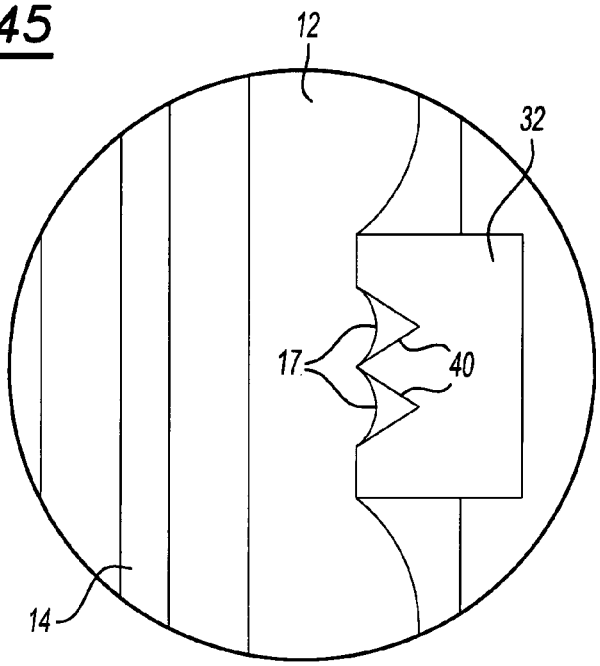

Referring now to FIGS. 45 through 47, connector element 30 is shown with crimping tabs 32 crimped around windshield wiping blade 12. This embodiment shown utilizes serrations 40 on tabs 32 to provide increased frictional retention of blade 12 due to bulges 17 flowing partially into the void created by the serrations, thereby securing blade 12 to connector 30.

Figure 48:
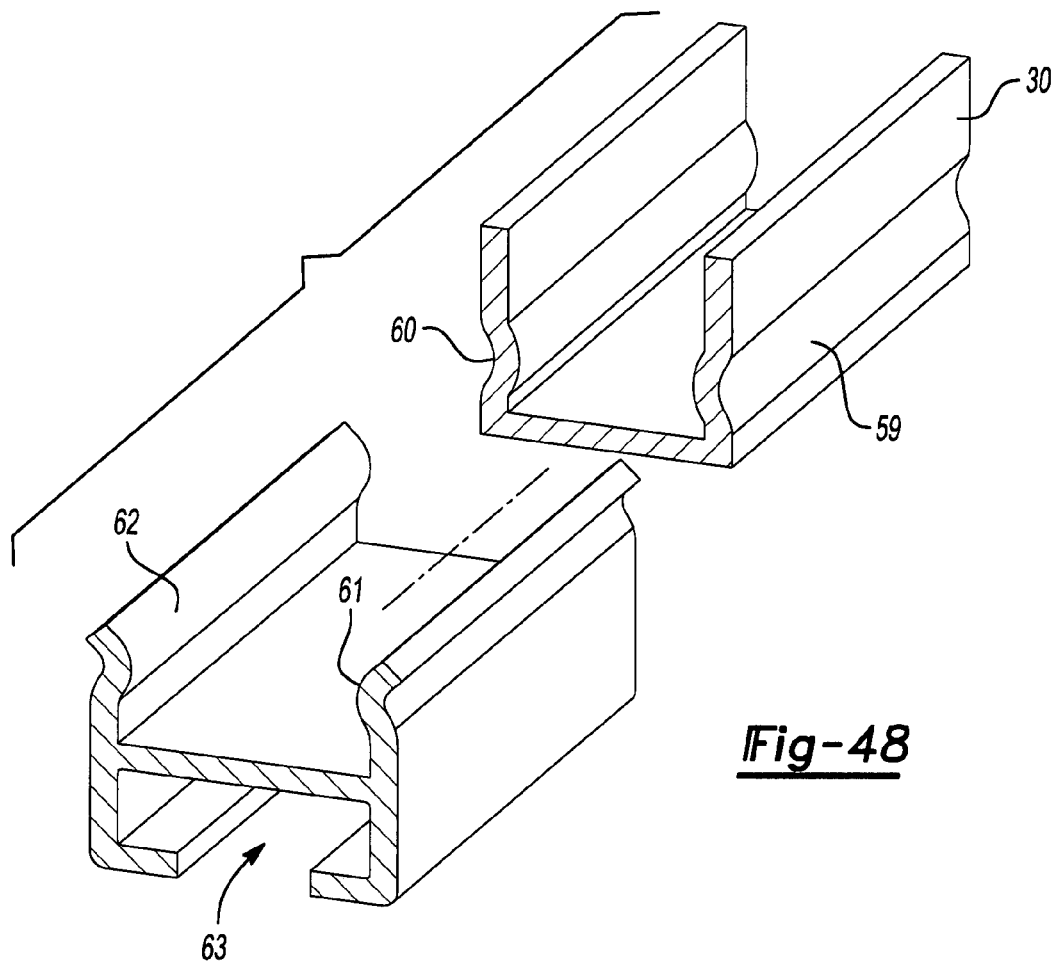
FIG. 48 illustrates a partial perspective assemblage view of an alternative embodiment to the connector element of FIG. 18.
Figure 49:
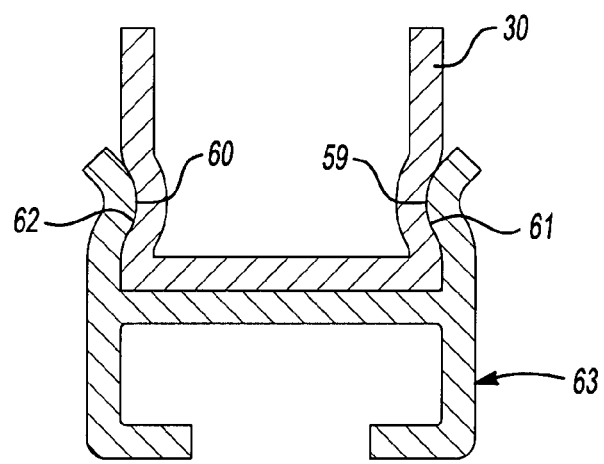
FIG. 49 illustrates a cross-sectional assembled view of the connector of FIG. 48.

As shown in FIGS. 48 and 49, an alternative embodiment for connector element 30 is shown, wherein the means of attaching to the wiper blade comprises a separate element 63, permanently or releasably attachable to connector element 30 by a pair of longitudinal ridges 61, 62 located on blade attachment element 63. Ridges 61, 62 are received in a pair of corresponding grooves 59, 60 located on the lateral sides of connector element 30.

Figure 50:
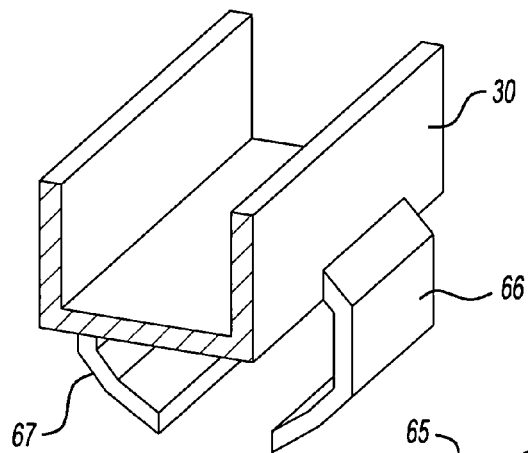
FIGS. 50 and 51 illustrate alternative embodiments to the connector element shown in FIG. 18.
Figure 51:
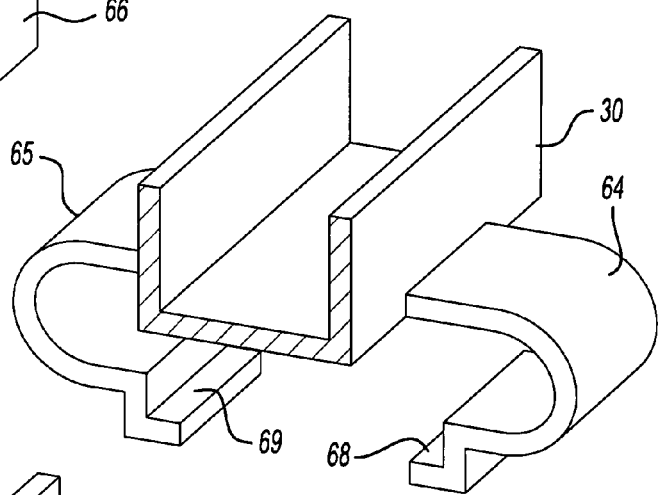
Figure 52:
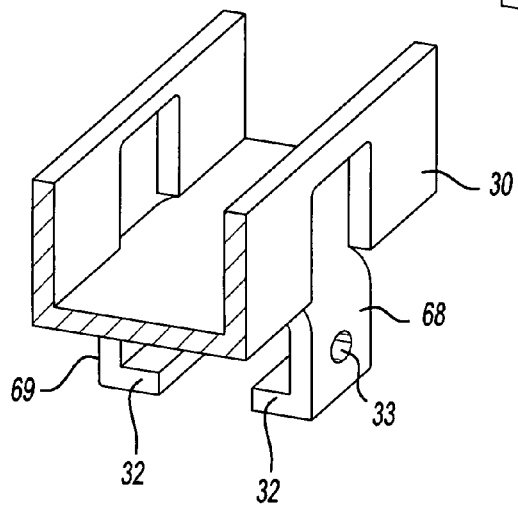
FIGS. 52 and 53 illustrate alternative embodiments to the connector element shown in FIG. 18.
Figure 53:
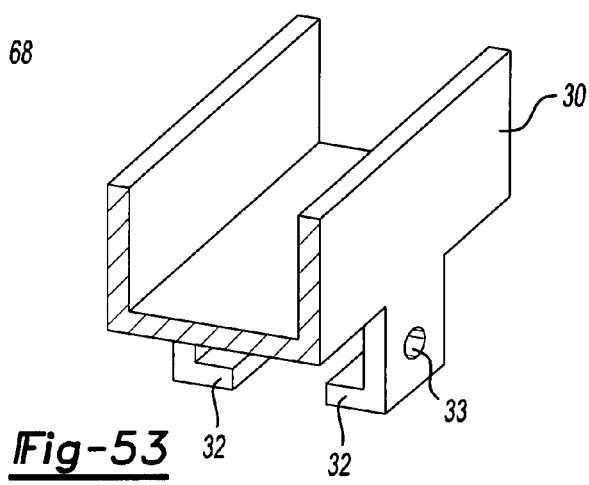
Figure 62:
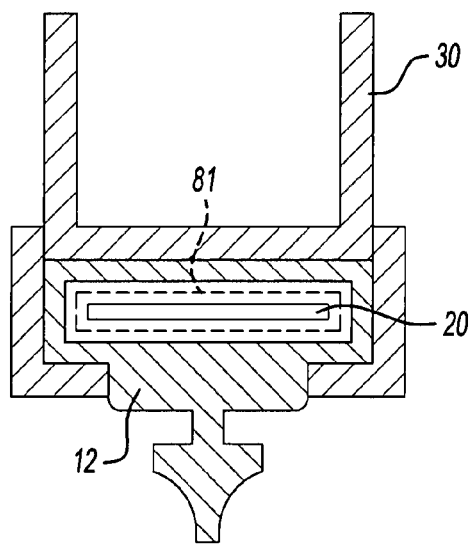
FIG. 62 illustrates a cross-sectional view of a wiper connector assembly with the anchoring means of the beam to the connector assembly.
Figure 63:
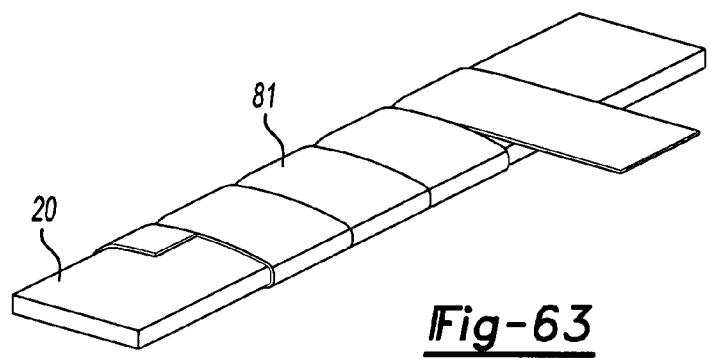
FIGS. 63 through 65 illustrate alternative embodiments of means of anchoring the beam to the connector assembly.
Figure 64:
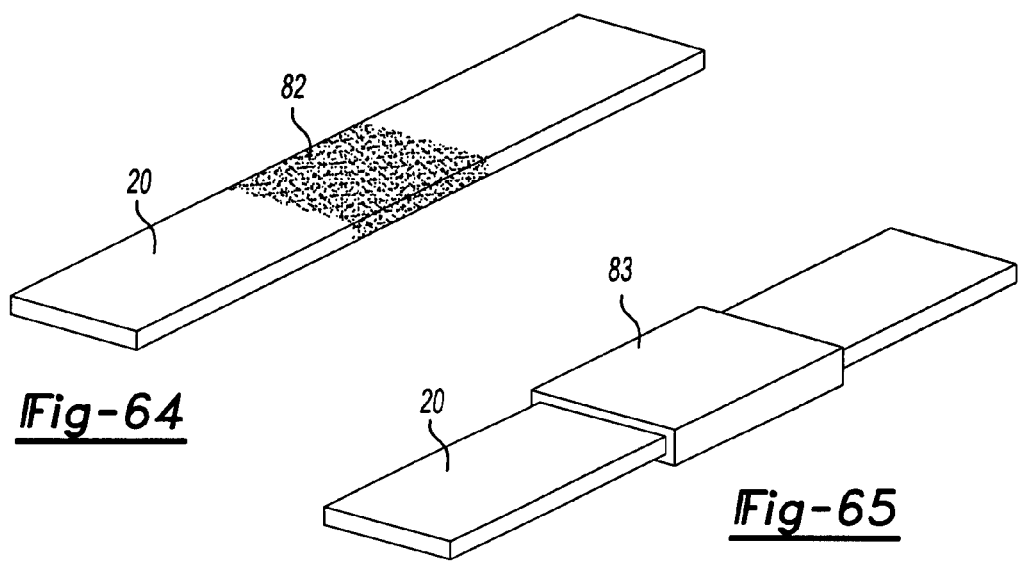
Figure 65:
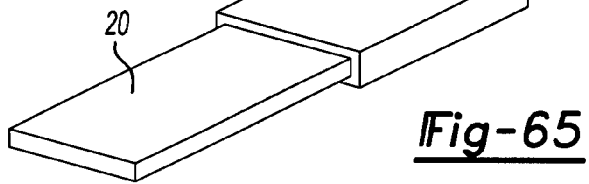
Figure 66:
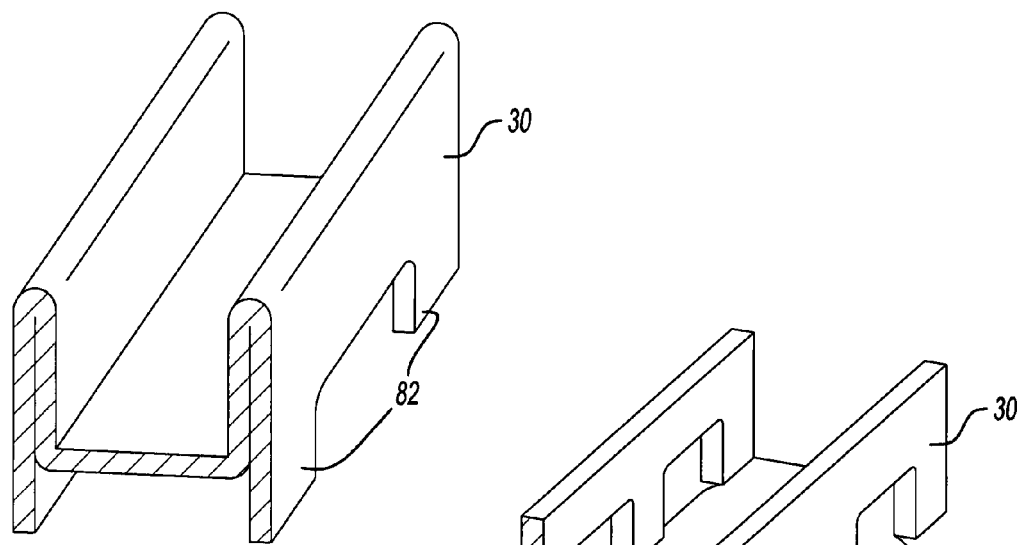
FIGS. 66 through 73 illustrate alternative embodiments for the connector element of the present invention.
Figure 67:
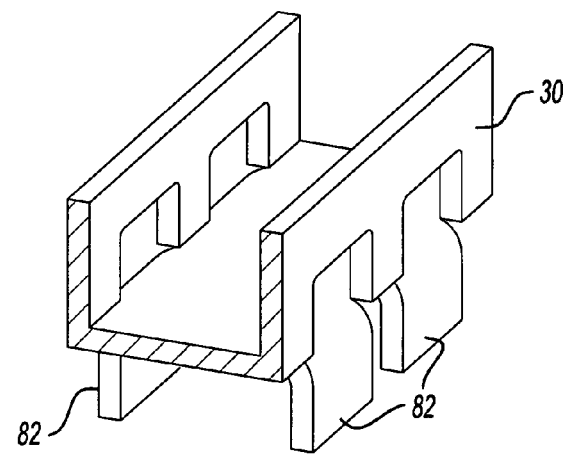
Figure 68:
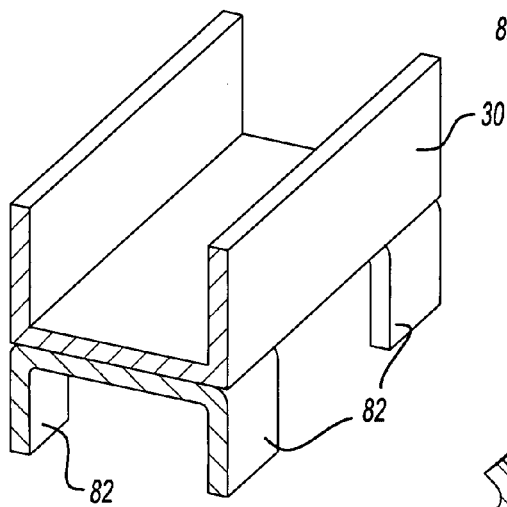
Figure 69:
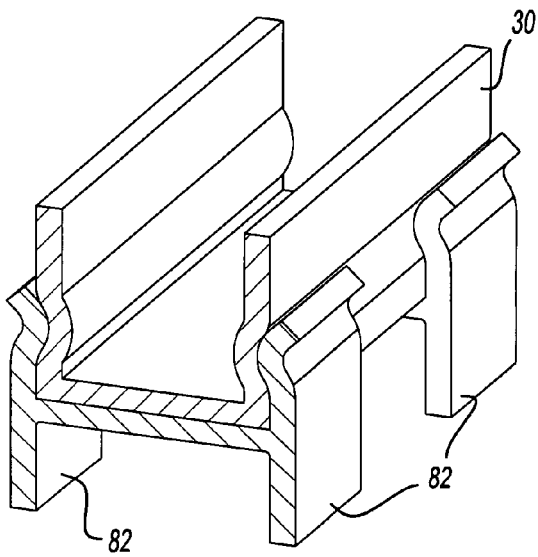
Figure 70:
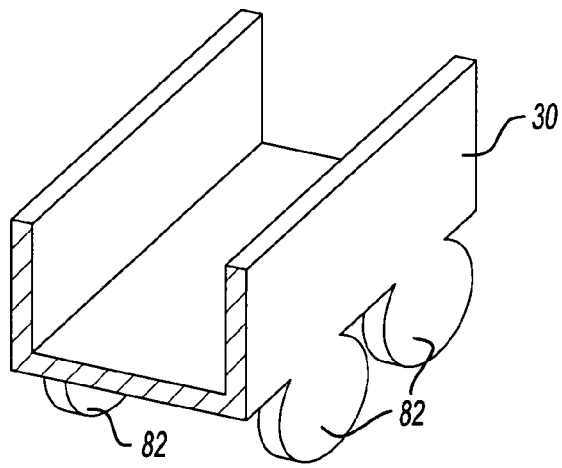
Figure 71:
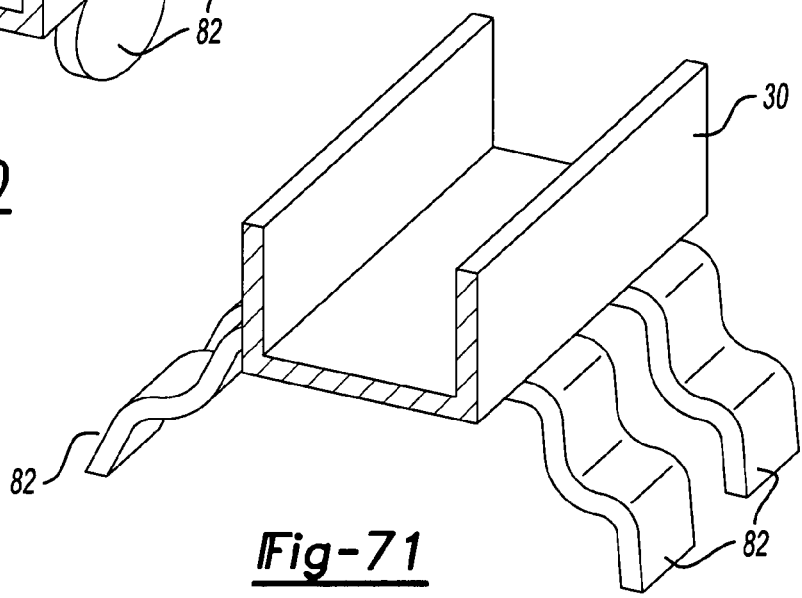
Figure 72:
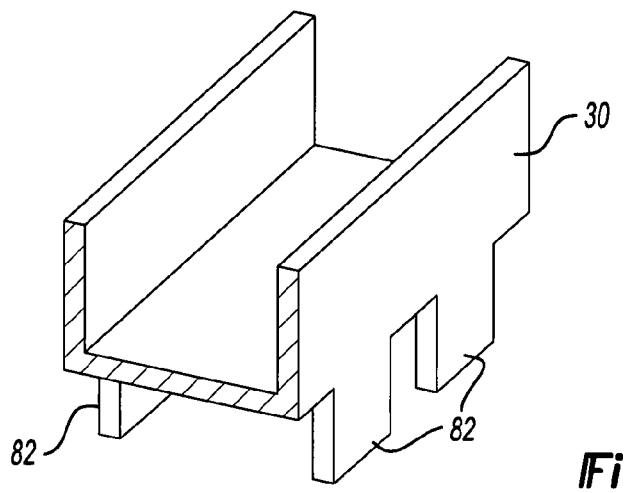
Figure 73:
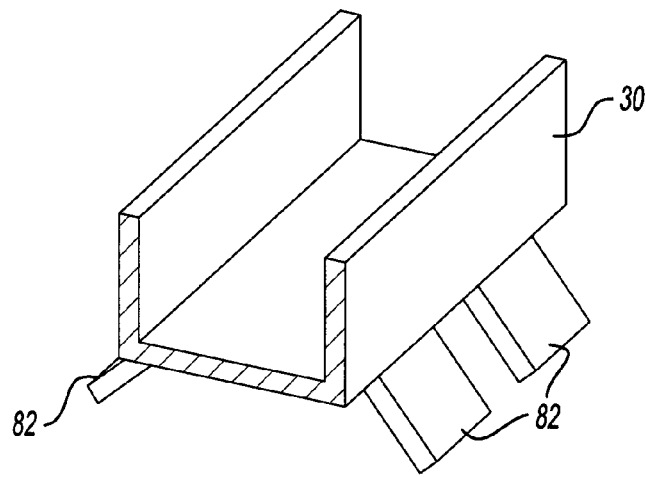
Figure 74:
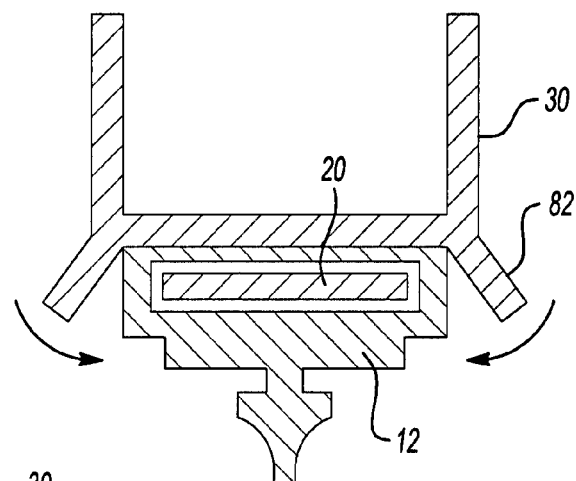
FIGS. 74 and 75 illustrate cross-sectional views of the pre-clamped and post-clamped connector element of FIG. 73 in conjunction with a wiper blade and support beam.
Figure 75:
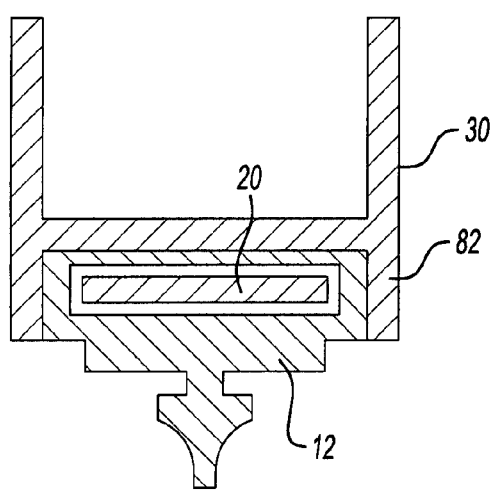
Figure 76:
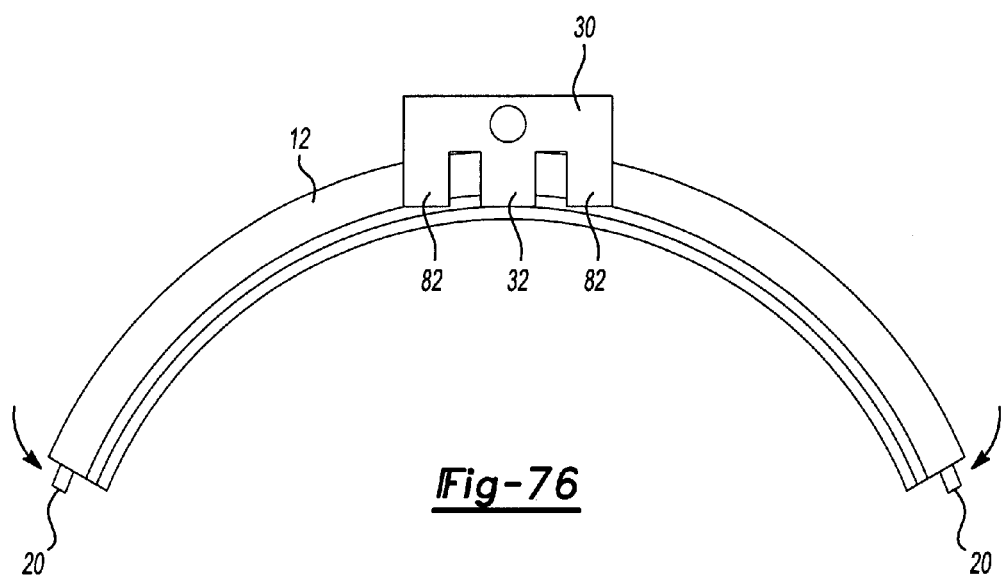
FIGS. 76 and 77 illustrate partial perspective side views of the wiper blade assembly of the an alternative embodiment in a flat and arcuate disposition, respectively.
Figure 77:
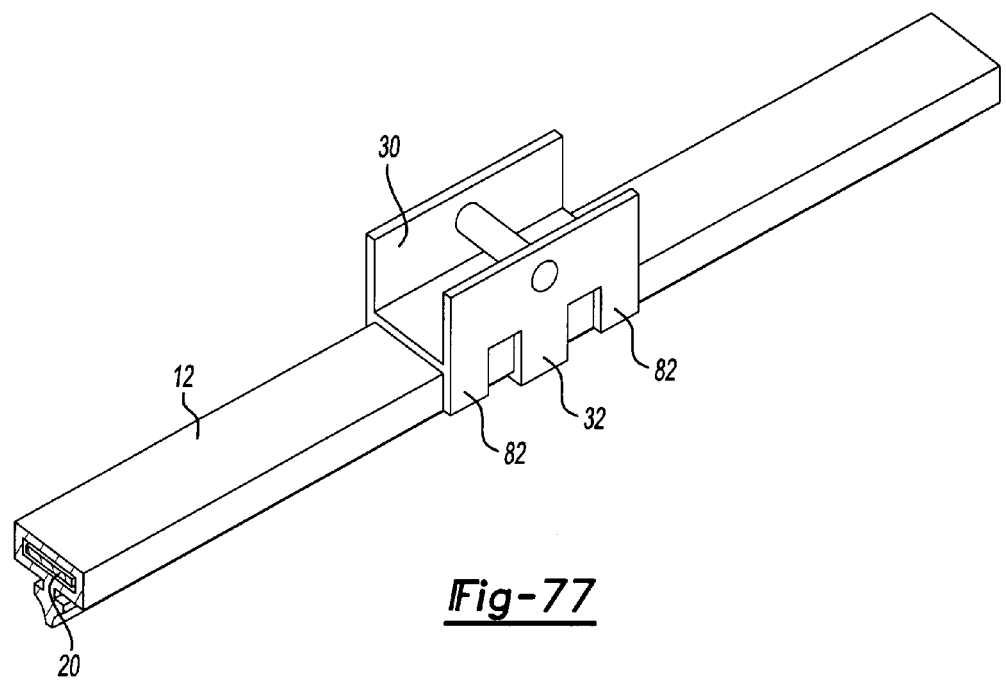
Figure 78:
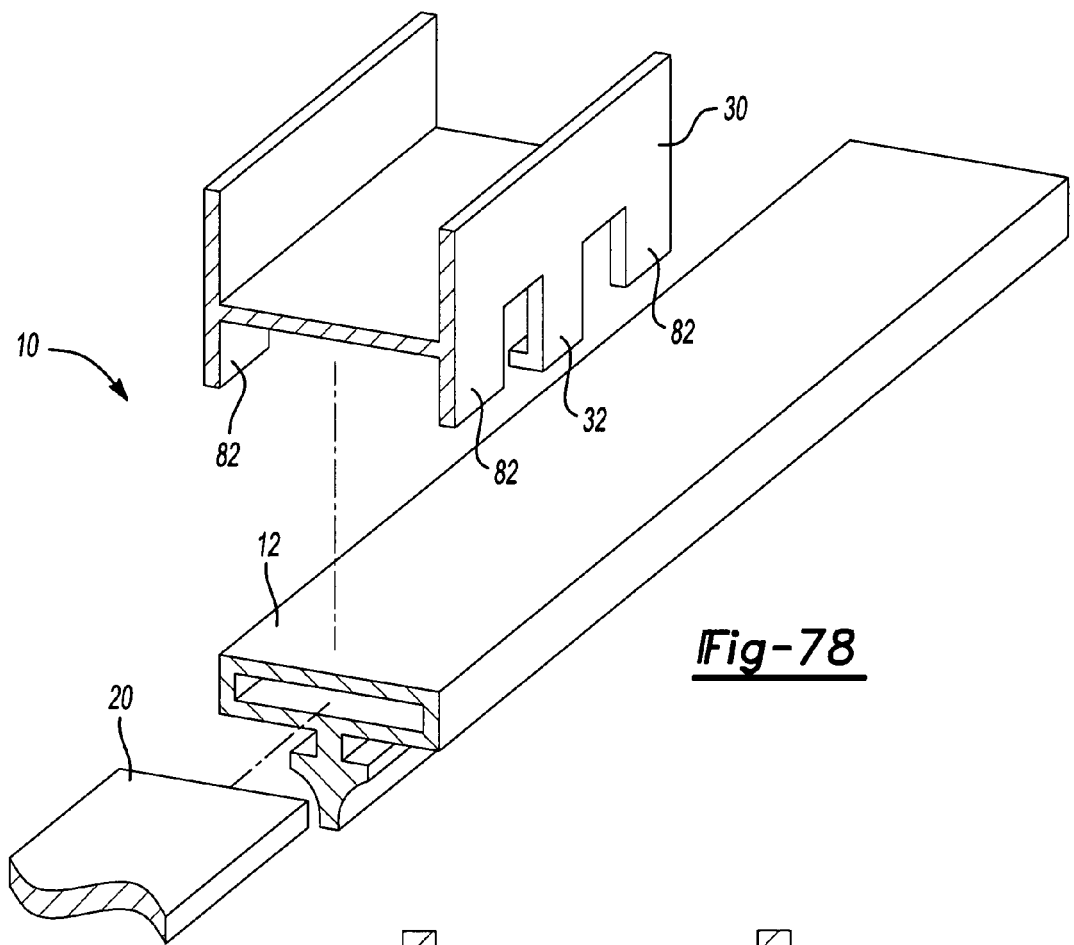
FIG. 78 illustrates a pre-assembled perspective view of the connector assembly of FIG. 76.
Figure 79:
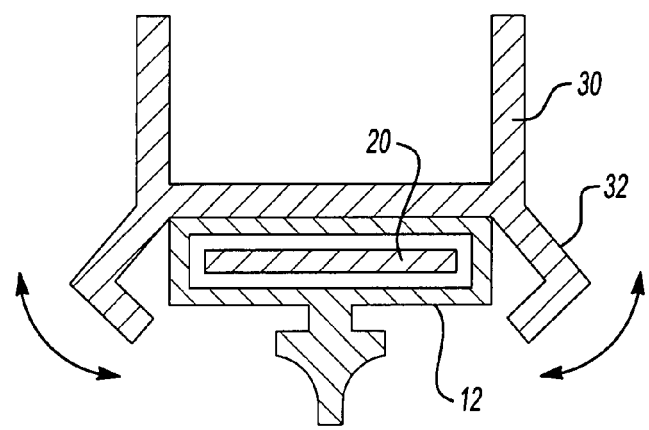
FIG. 79 shows a cross section of the connector assembly of FIG. 78 illustrating the releasable, re-connectable crimping tabs.

FIGS. 50 through 53 illustrate further embodiments of connector elements 30. In FIG. 50, connector element 30 comprises a pair of tabs 66, 67 projected outward from the lateral sides of connector element 30 which are deflected downward and then slightly inward, creating a seven-sided channel on the under side of connector 30 for receiving a wiper blade. FIG. 51, similar in design, has a pair of outward projected tabs 64, 65 which are bowed outward a predetermined distance from connector 30 before reflecting back inwards and terminating in a pair of blade support channels 68, 69. FIG. 52 shows the connector element formed of a single piece of either metal or other suitably stamped material wherein tabs 68, 69 are cut out from connector element 30 and deflected downward prior to installation. Tabs 68, 69 comprise a pair of inward deflecting crimping tabs 32 described herein, for securing a wiper blade there between. Furthermore, this embodiment illustrates the apertures 33 through which the resilient blade material is partially received upon the crimping of the tabs around the assembly, preventing relative axial translation between connector element 30 and the wiper blade. FIG. 53 is a similar designed embodiment, wherein connector element 30 is formed with crimping tabs 32 in the already downward disposition, ready for receiving the wiper blade and support beam therebetween.

FIGS. 54 and 55 illustrate windshield wiper assembly 10 in both a generally planar and an arcuate flexed orientation. As disclosed, connector element 30, when attached to blade 12, securely holds the blade generally in mid section by means of crimping tabs 32 without puncturing the resilient material that blade 30 is manufactured from. When wiper assembly 10 is applied to an arcuate surface, such as a windshield, the support beam which may be pre-formed with an arch is allowed to axially slip within blade 12 on either side of the connector element 30, but not within the connector. This is illustrated by the length of the support element 20 L' and L extending beyond wiping blade 12 in FIGS. 54 and 55. When the blade assembly is flattened out as illustrated in FIG. 54, the length of L' is significantly shorter than the length of L shown in FIG. 55 which shows the blade in its natural state.

FIGS. 56 through 61 Illustrate a plurality of embodiments for support beam 20 having serrations 22 proximal the location of the attachment zone of connector element 30. These serrations provide the security of the support beam to the blade element, preventing relative axial translation at the point of the connector element. FIGS. 62 through 65 further illustrate various means of anchoring support beam 20 within connector element 30 to prevent relative axial translation of the beam within blade 12. These anchoring means 81, 82, 83 are detachably attachable and can be a single-point, relatively-short length or multiple points and may comprise: plastic, wood, tape, paint, adhesive, epoxy, foil, rubber, metalized spray, or grit wrap, for example.

Referring now to FIGS. 66 through 75, connector elements 30 are shown in various embodiments having stabilizing tabs 82 formed within or attached thereto. These tabs 82 in a preferred embodiment are formed of steel, though not limited to this material, and are bendable to impinge upon or simply close upon blade 12 and the assembly of support beam 20. This provides a stabilized position between connector element 30 and beam 20 to resist and prevent rotational movement of the connector relative to the beam. Additionally, it does not require the intimate contact of tabs 82 and the beam itself, retaining the integrity of blade 12. FIGS. 76 through 79 further illustrate wiper assembly 10 utilizing connector element 30 having stabilizer tabs 82, in conjunction with crimping tabs 32.

Figure 80:
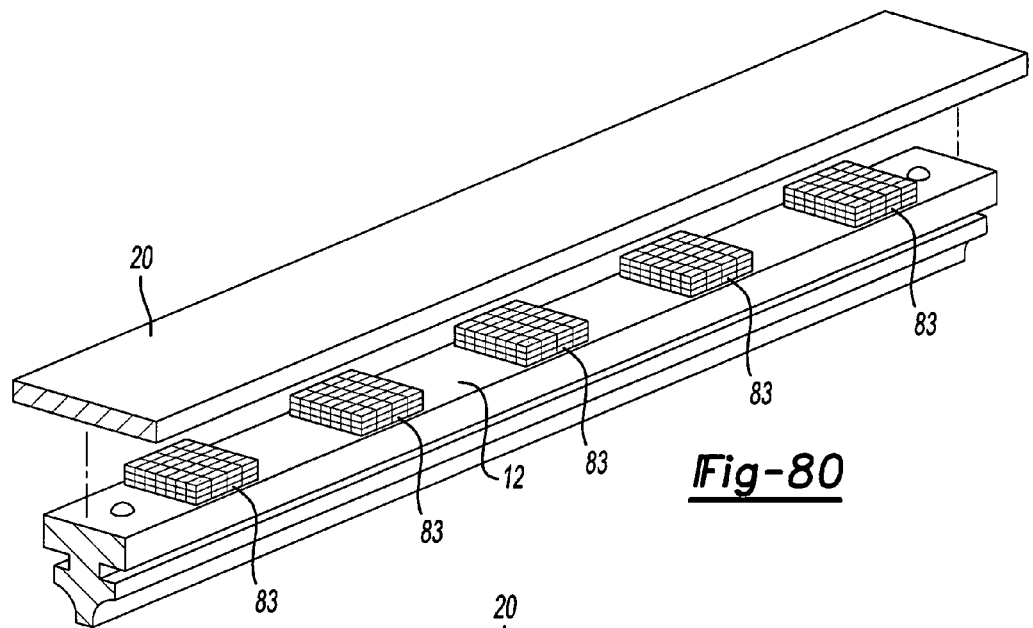
FIGS. 80 and 81 illustrate a partial perspective and cross-sectional end view, respectively, of an alternative embodiment of the connection means between the wiper blade and the support beam.
Figure 81:
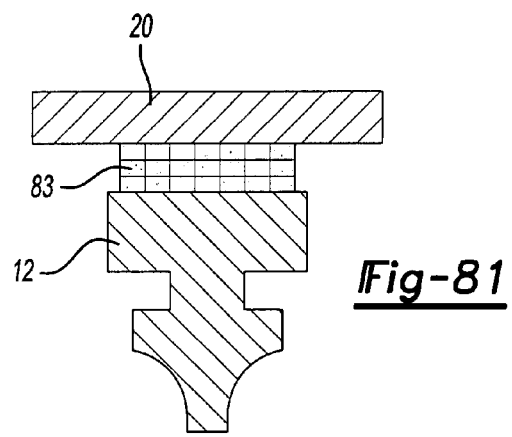

FIGS. 80 and 81 Illustrate an alternative embodiment to the assembly of support beam 20 and wiping blade 12. This embodiment utilizes the application of adhesive 83 at one or more positions along the top surface of wiping blade 12 for securing to the bottom portion of support beam 20. This embodiment does not require the insertion of support beam 20 through an aperture in blade 12 and can provide for the application-specific tuning of preventing relative axial translation.

Figure 82:
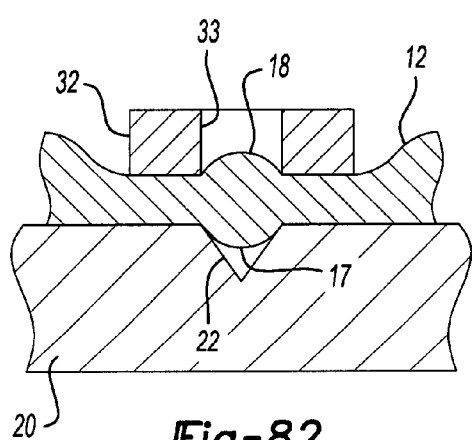
FIGS. 82 and 83 illustrate a cross-sectional view and a close-up, cross-sectional view of the connector tab/wiper blade/support beam interface.
Figure 83:
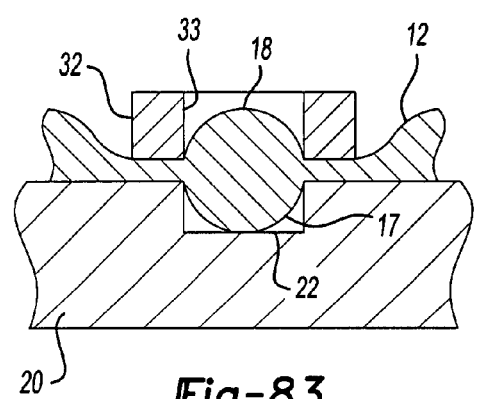

Referring now to FIGS. 82 and 83, a close-up, cross-sectional view of the interface between crimping tabs 32, wiping blade 12, and support beam 20 is shown. Support beam 20, as shown in this embodiment, comprises a lateral groove 22 which assists in securing beam 20 within blade 12. When crimping tabs 32 are crimped around blade 12 and beam 20 assembly, a portion of the resilient material of blade 12 form inward bulges 17 proximal the serrations or grooves 22, preventing axial translation of wiping blade 12 relative to support beam 20 at the connector location. Upon the crimping of the tabs around the assembly, outward bulges 18 of the resilient material of blade 12 form within apertures 33 of crimping tabs 32, which prevents relative axial translation between connector element 30 and wiping blade 12.

Figure 84:
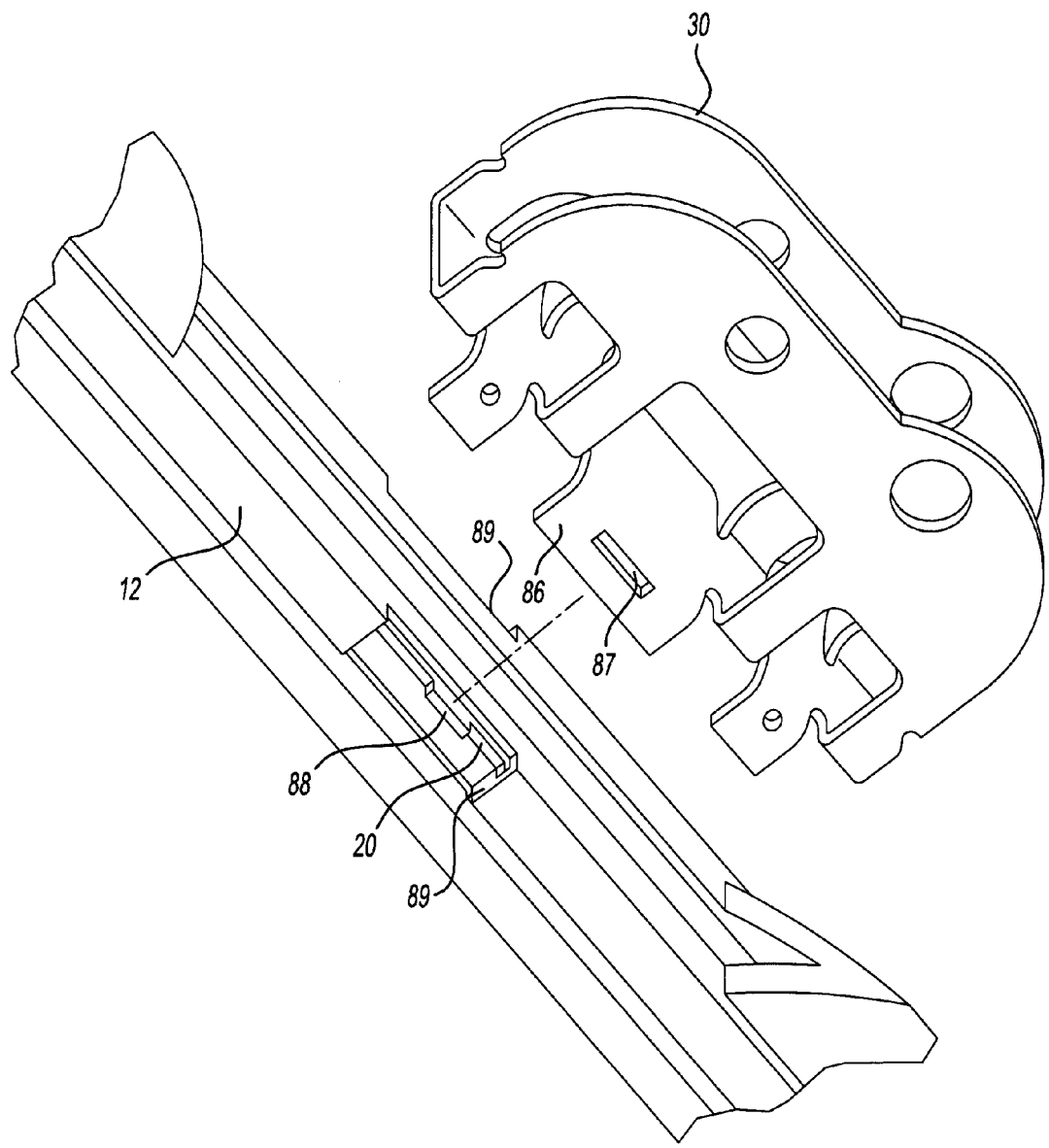
FIG. 84 illustrates a pre-assembly perspective view of alternative embodiment for the connector wiper blade junction.
Figure 85:
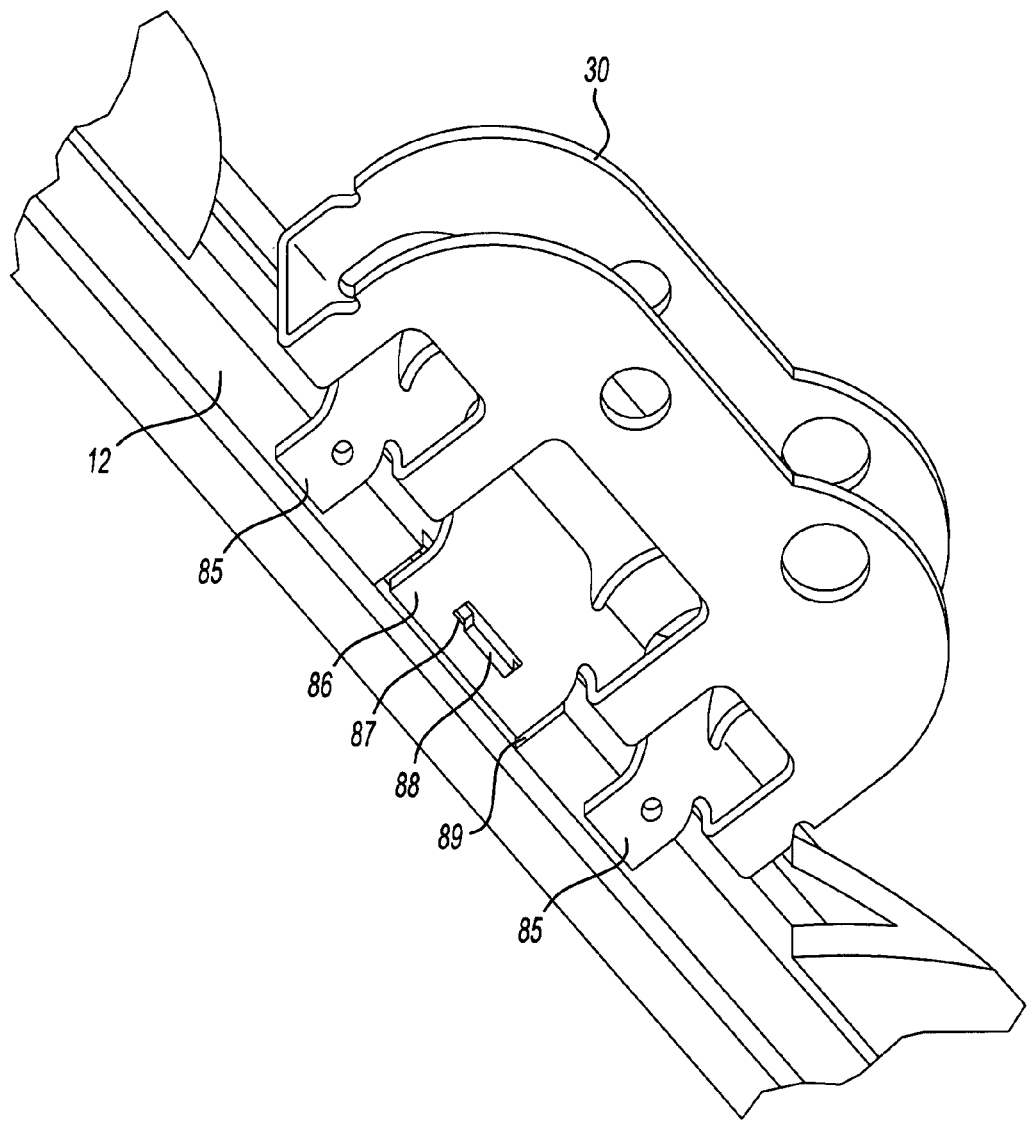
FIG. 85 illustrates a partial perspective view of the connector junction of FIG. 84 in an assembled disposition.
Figure 86:
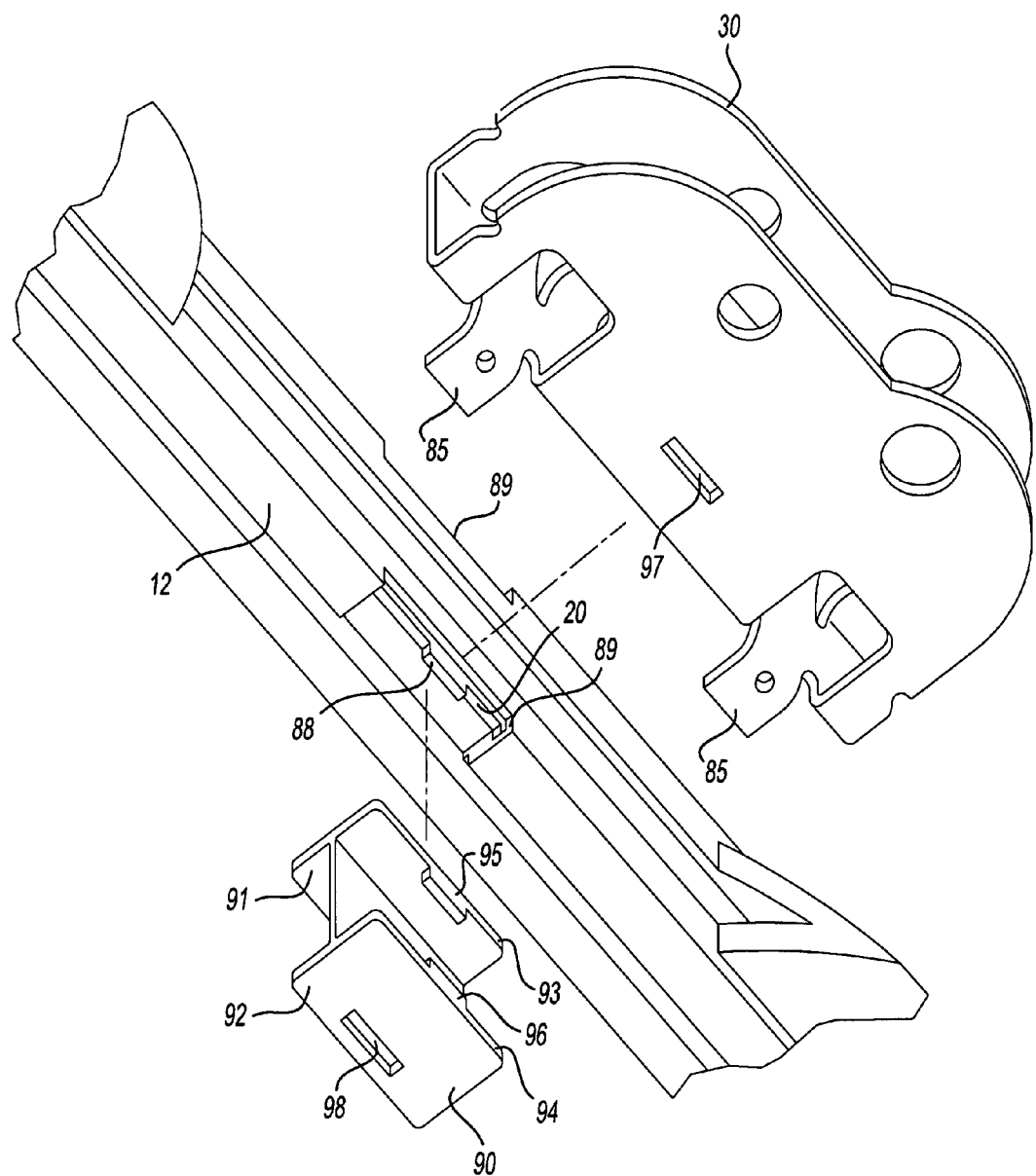
FIG. 86 illustrates a pre-assembly perspective view of an alternative embodiment for the connector wiper blade junction.
Figure 90:
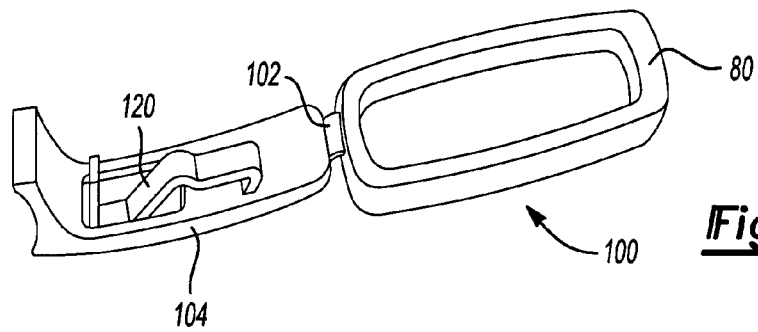
FIG. 90 is a perspective view of a collar and connector representing another embodiment of the present invention.
Figure 91:
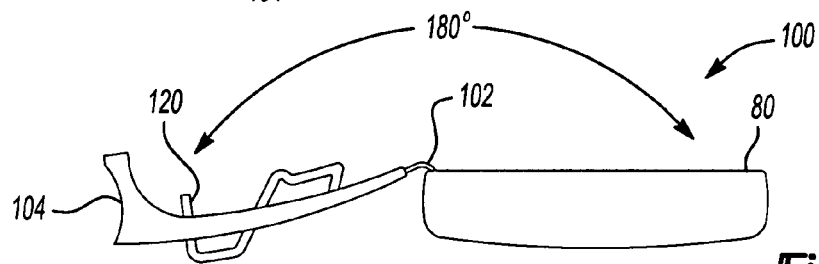
FIG. 91 is a side view of the embodiment shown in FIG. 90.
Figure 92:
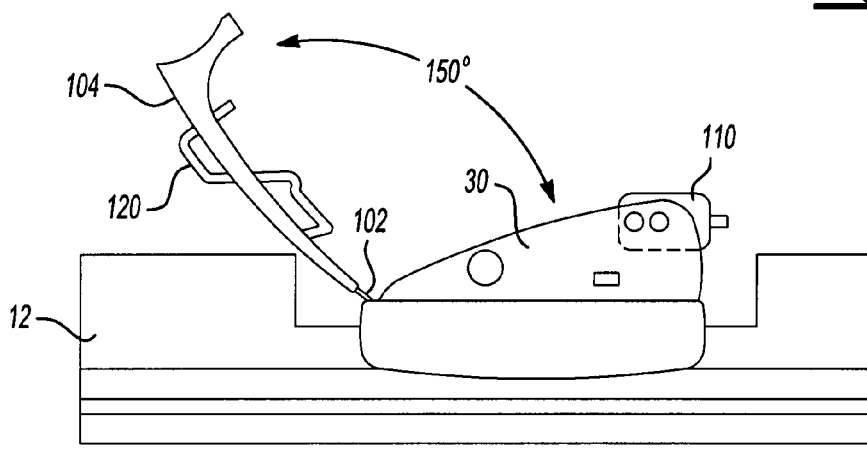
FIG. 92 is an opened side view of the embodiment shown in FIG. 90 attached to a windshield wiper assembly.
Figure 93:
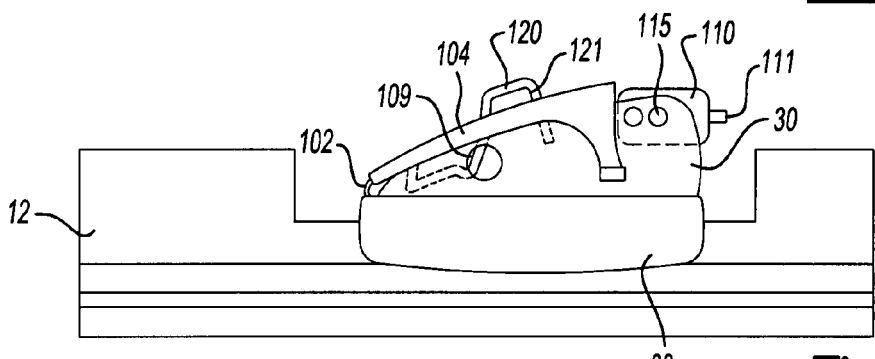
FIG. 93 is a closed side view of the embodiment shown in FIG. 90 attached to a windshield wiper assembly.

An alternative embodiment to connector element 30 is shown in FIGS. 84 through 86. Connector 30 comprises a plurality of downward stabilizing tabs 85 and at least one pair of downward projecting attachment tabs 86, which have receiving apertures 87 there through. Receiving apertures 87 receive attachment tab 88 of support beam 20. A portion 89 of blade 12 is removed to expose attachment tab 88 which is press-fitted down upon the blade and beam assembly. In a further example shown in FIG. 86, an intermediate adapter 90 is implemented. Adapter 90 comprises a pair of downward projecting tabs 91, 92 which have corresponding receiving apertures 87 there through for receiving attachment tabs 88. The upper portion of adapter 90 has a pair of upward projecting connector attachment tabs 93, 94 with corresponding inward-orientated connector locking tabs 95, 96 which are received in corresponding apertures 97 on connector element 30.

Referring now to FIGS. 87 through 89, the assembly steps are shown for an alternative embodiment to connector element 30. This embodiment, similar in design and function to the one illustrated in FIGS. 48 and 49, comprises connector element 30, having a pair of longitudinal receiving channels 59, 60 on the lateral sides therewith for receiving corresponding longitudinal ridges 61, 62 of blade attachment element 63. This attachment element is preformed with a pair of outwardly deflected crimping tabs 71, 72, which terminate in a 'T', having a pair of inward blade supporting elements 73, 74 and a pair of outward projecting collar supporting elements 75, 76. When the combination of blade 12 and support beam 20 is brought up under connector element 30 in the desired position for attachment, a corresponding rectangular collar 80 is placed over connector element 30, as shown, and pushed downward over blade attachment element 63. As collar 80 is pushed downward, it biases crimping tabs 71, 72 inward until blade 12 and support beam 20 are secured therebetween and wherein the collar is retained by collar support elements 75, 76. Blade 12 may be releasable from connector element 30 by simply reversing the process and raising collar 80, thereby allowing tabs 71, 72 to reflect outwards, releasing the assembly of blade 12 and support beam 20.

FIGS. 90 through 93 show an alternative embodiment to the collar shown in FIGS. 87 and 88. In this embodiment collar 80 is manufactured in combination with a universal wiper arm connector 104 having a hinge 102 on one end for connecting the two components, forming a universal attachment assembly 100. Connector 104 further comprises a living hinge 120 that cooperates with connector 104 to adapt to several of the most popular wiper arm styles. Assembly 100 can be manufactured or formed from plastics or other engineered polymers or castings known in the art.

Figure 99:
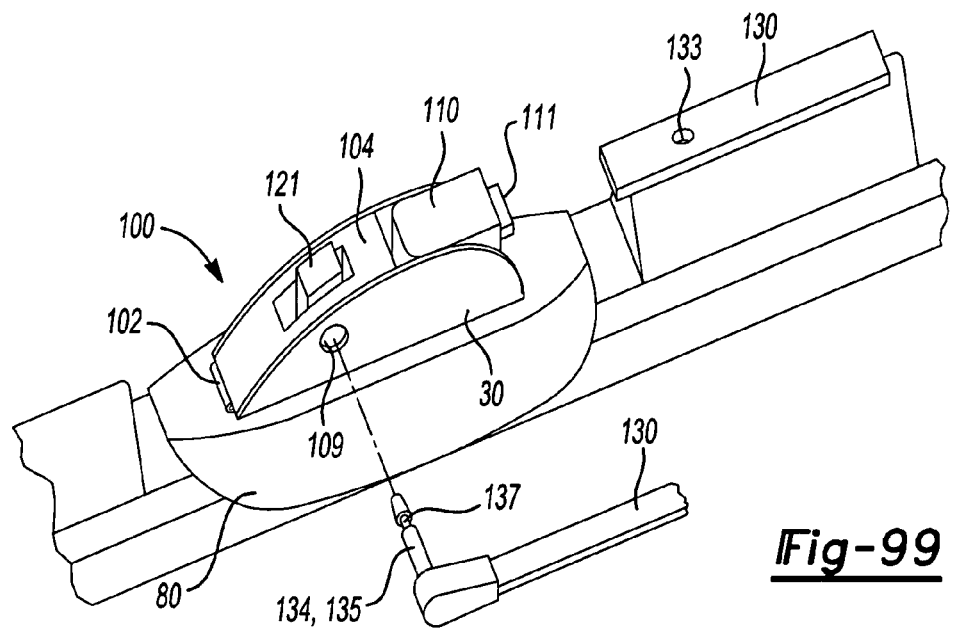
FIG. 99 illustrates a partial perspective view of a windshield wiper assembly in conjunction with the wiper arms of FIGS. 94 and 95.

FIGS. 94 through 98 illustrate the five most popular types of windshield wiper arms 130 on the market. These types include windshield wiper arms 130 with a large lateral pin 134, a small lateral pin 135, a large hook end 131, a small hook end 132, as well as one that is flat and has a receiving aperture 133. These styles are all intended to be compatible with universal assembly 100. FIG. 99 shows how the style that is flat and has a receiving aperture 133, as well as the style with large and small lateral pins 134, 135, respectively, are attached to assembly 100. To attach lateral pin 134, 135 to assembly 100, lateral pin 134, 135 is inserted through receiving aperture 109 in connector element 30 and cooperates with living hinge 120 so the hinge is biased out of the way during insertion of the pin but reflects back when it is adjacent the locking groove 137 located on lateral pin 134, 135. This secures the pin within connector 104 and is releasable by pushing the exposed portion 121 of hinge 120 that extends partially out of the release aperture 123 located in the connector 104 while simultaneously withdrawing lateral pin 134 or 135.

Figure 100:
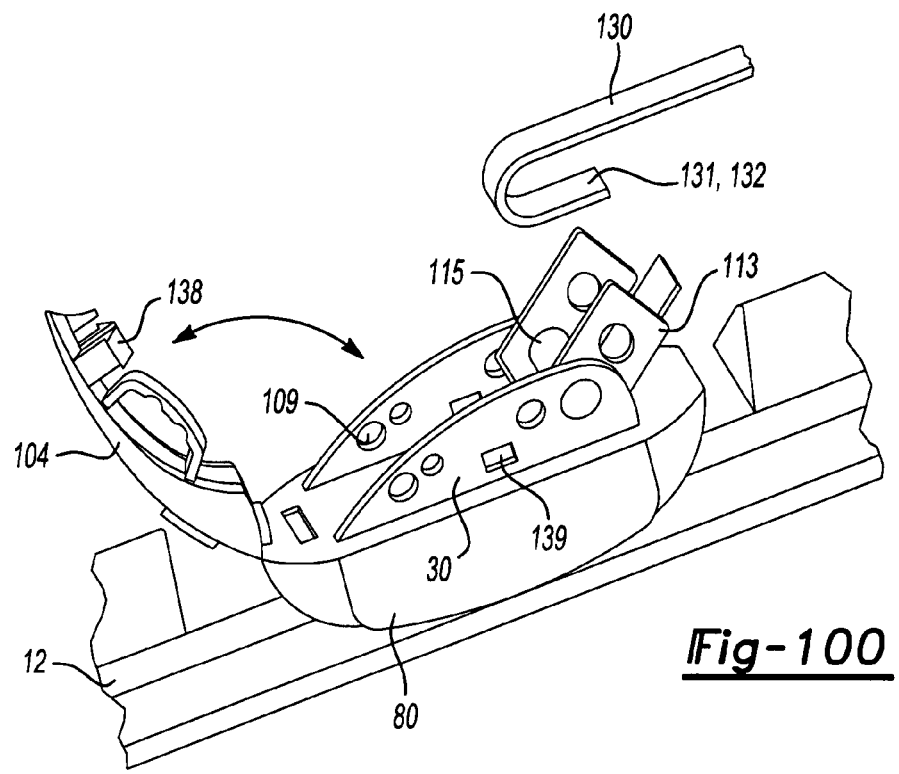
FIG. 100 illustrates a partial perspective view of a windshield wiper assembly in conjunction with the wiper arm of FIG. 96.

With regard to wiper arm 130 having a flat end, it is received in the adapter 110, which is pivotally attached to a rivet 115 or other pivot point connecting the two lateral sides of connector element 30. Adapter 110 comprises a receiving aperture 111 and an internal locking means which cooperates with aperture 133 to releasably secure the flat end style wiper arm to connector 30. An additional adapter 113 is pivoted upwards while connector 104 is open and further provides a means for attaching hook style wiper arm 132, 133 as shown in FIG. 100. Hook ends 131 or 132 are received around pivot point 115, wherein connector 104 is subsequently closed as indicated by the arrows. Once connector 104 is hinged closed, adapter 113 prevents the hook from dislodging, securing the wiper assembly to wiper arm 130. Universal connector 104 is secured to connector element 30 by a pair of biasing tabs 138 which are received in corresponding apertures 139 on connector element 30. This and collar are intended to provide a smooth transition between an airfoil portion of the windshield wiper and the connector.

Figure 101:
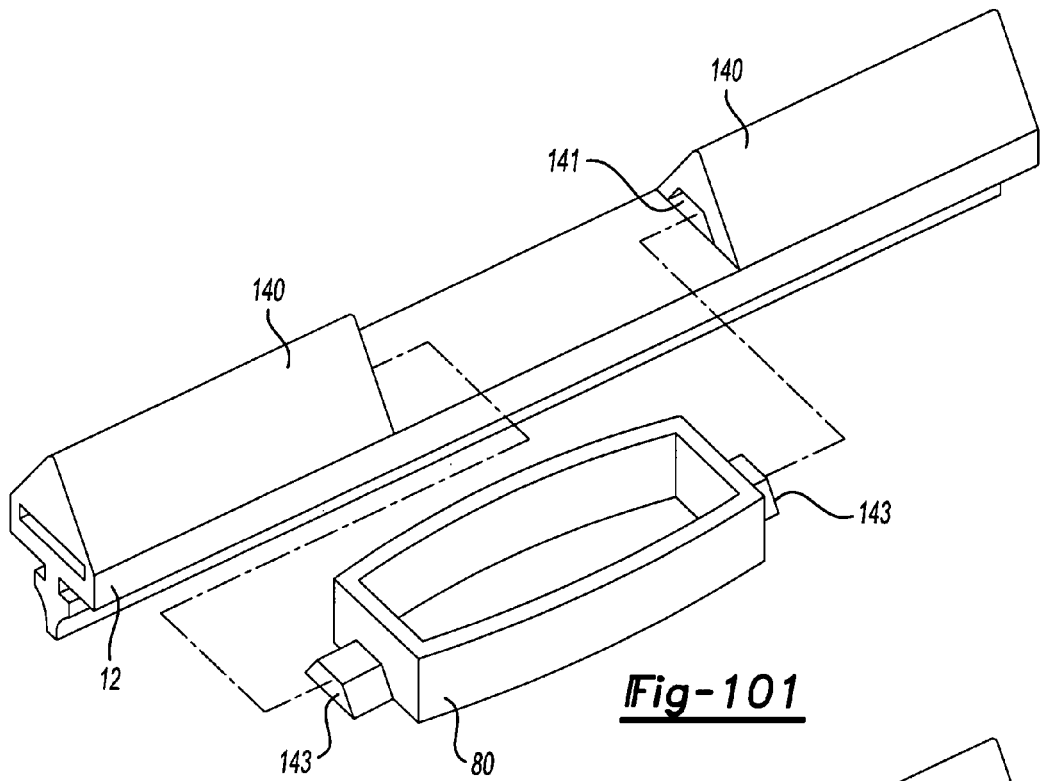
FIGS. 101 and 102 illustrate partial perspective assembly views of a further embodiment of the present invention comprising the connector collar/shroud.
Figure 102:
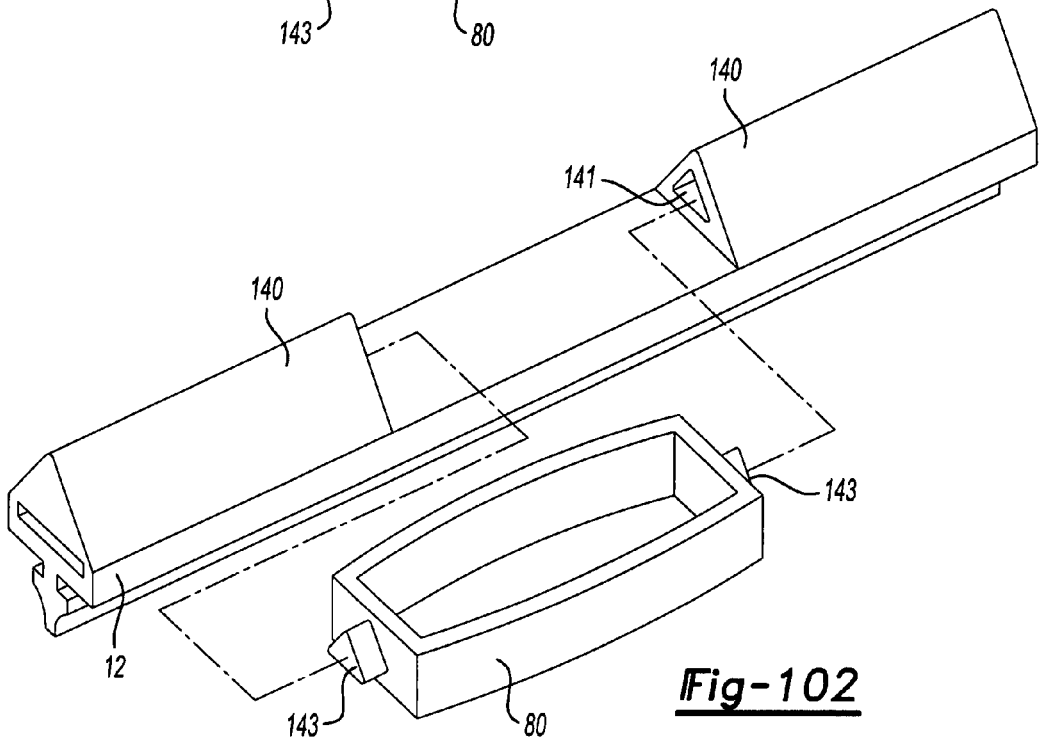
Figure 103:
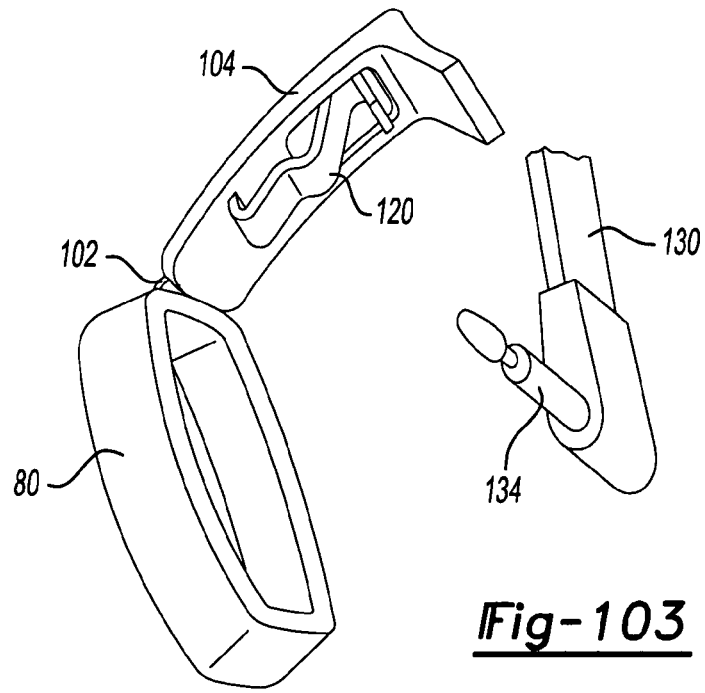
FIG. 103 is a partial perspective view of a further embodiment representing a collar/connector combination.
Figure 104:
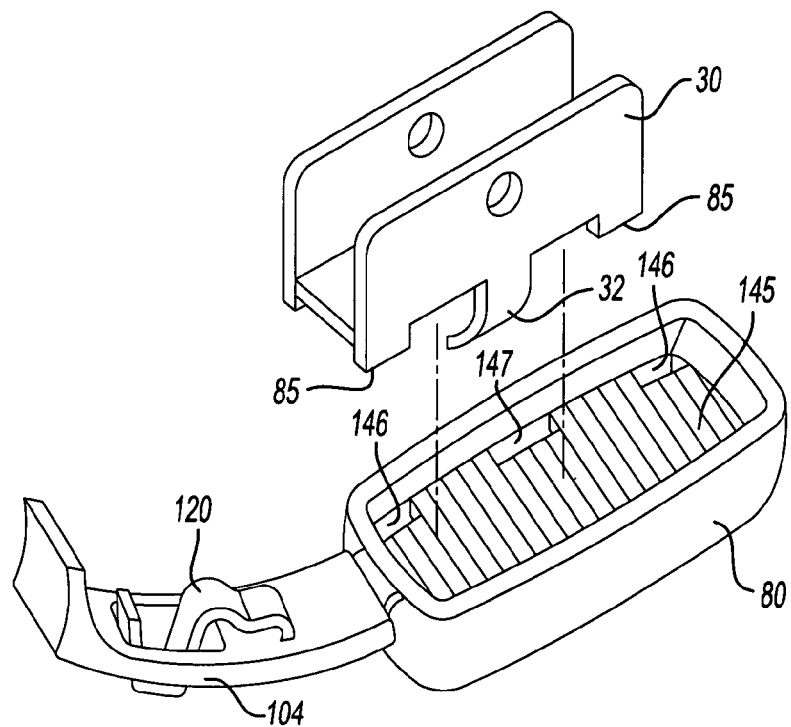
FIG. 104 is a partial perspective view of a further embodiment representing a collar/connector combination.

Referring now to FIGS. 101 and 102, an alternative embodiment is shown wherein collar 80 is attached to the wiper blade and beam assembly by a pair of attaching tabs 143 which are received in corresponding apertures 141 located in a raised airfoil portion 140 of blade 12. The raised portion 140 is notched out to receive collar 80, which may include a pivotally attached connector 104 as shown in FIGS. 90 through 93. FIGS. 103 and 104 illustrate a further embodiment wherein pin style wiper arm 134 is receivable in connector 104 and collar 80 comprises a floor member 145 which has apertures 146, 147 for receiving stabilizer tabs 85 and crimping tabs 32 of connector element 30.

Figure 105:
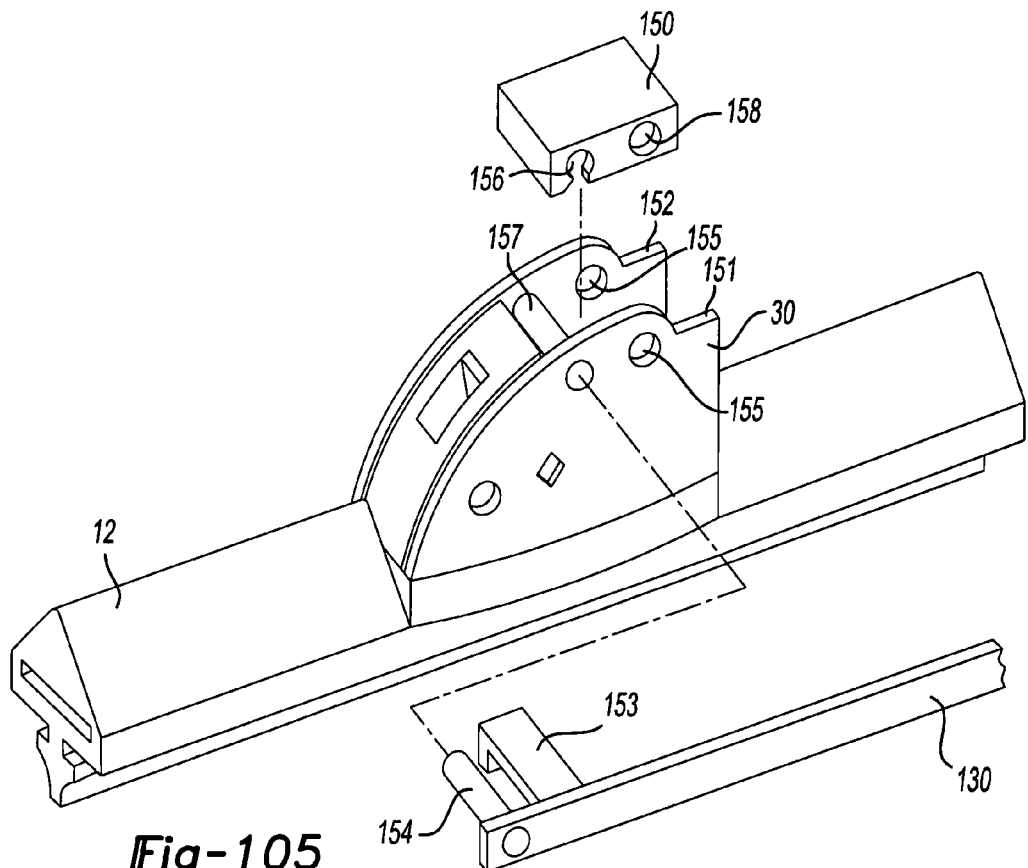
FIG. 105 is a partial perspective pre-assembly view of a further embodiment representing a wiper blade/connector combination.
Figure 106:
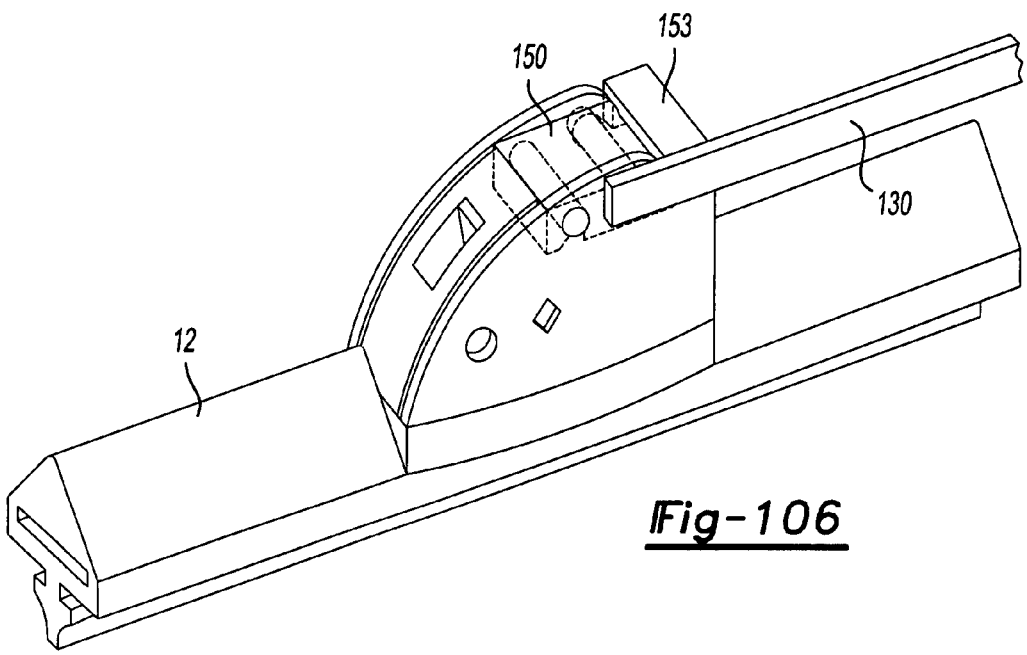
FIG. 106 is a partial perspective assembled view of the embodiment shown in FIG. 105.

FIGS. 105 and 106 represent a further embodiment of the present invention wherein connector element 30 comprises rivet 157 connecting the two lateral sides of the connector element, apertures 155 for receiving pin 154 on wiper arm 130, and support shoulders 151, 152 for supporting arm 153 of wiper arm 130. This style of wiper arm 130 utilizes the arm 153 to restrict rotation of the wiper blade assembly around pin 154. Locking foot 150, comprising a pin receiving aperture 158 and rivet locking slot 156, is inserted into connector element 30 between the lateral sides so as to releasably attach to rivet 157, and apertures 158 and 155 are in alignment for receiving pin 154 of the wiper arm therethrough.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A windshield wiper blade assembly comprising:
  a resilient wiping element, said wiping element comprising a longitudinal passage therethrough;
  a semi-rigid, encapsulated beam member, said encapsulated beam member positioned within said longitudinal passage;
  a single windshield wiper connector element located at an approximate mid-point of said encapsulated beam member, said connector element universally detachably attaching said wiper blade assembly to at least one type of a windshield wiper arm attached to a motor vehicle, wherein
  said wiper connector element is isolated from said encapsulated beam member;
  the single wiper connection element is the only connection between said wiper blade assembly and said windshield wiper arm:
  said connector element coupled by securement means to said resilient wiping element and said encapsulated beam member in such a way as to prevent the rotation and twisting of the resilient wiper blade around said encapsulated beam member, and further preventing longitudinal translation of said encapsulated beam member within said resilient wiping member.

2. The windshield wiper blade assembly of claim 1, wherein said resilient wiping member comprises a longitudinally extending raised airfoil element positioned on an upper side of the windshield wiping element.

3. The windshield wiper blade assembly of claim 2, wherein said securement means of said connector element comprises at least two lateral, downward projecting crimping arms, frictionally attaching to said encapsulated beam member and wiping element.

4. The windshield wiper blade assembly of claim 3, wherein said encapsulated beam member comprises a plurality of lateral detents, proximal the attachment location of said connector element, through which resilient wiping element is partially forced within when said crimping arms are crimped to the encapsulated beam member and wiping element assembly.

5. The windshield wiper blade assembly of claim 3, wherein said downward projecting crimping arms comprise at least one pair of impinging points, which impinge the resilient wiping element when said crimping arms are crimped to the encapsulated beam member and wiping element assembly.

6. The windshield wiper blade assembly of claim 3, wherein said encapsulated beam member comprises at least one aperture positioned proximal the attachment location of said connector element, through which resilient wiping element is partially forced within when said crimping arms are crimped to the encapsulated beam member and wiping element assembly.

7. The windshield wiper blade assembly of claim 3, wherein said encapsulated beam member comprises at least one pair of lateral protrusions proximal the attachment location of said connector element, frictionally retaining the position of said support beam within said wiping element when said crimping arms are crimped to the encapsulated beam and wiping element assembly.

8. The windshield wiper blade assembly of claim 3, wherein said encapsulated beam member comprises at least one raised impression, proximal the attachment location of said connector element, frictionally retaining the position of said encapsulated beam member within said wiping element when said crimping arms are crimped to the encapsulated beam member and wiping element assembly.

9. The windshield wiper blade assembly of claim 3, wherein said downward projecting crimping arms comprise at least one pair of raised impressions, frictionally retaining the position of said encapsulated beam member within said wiping element when said crimping arms are crimped to the encapsulated beam member and wiping element assembly.

10. The windshield wiper blade assembly of claim 3, wherein said encapsulated beam member further comprises at least one means of frictionally maintaining its position within said wiping element proximal the attachment location of said connector element, frictionally retaining the position of said support encapsulated beam member within said wiping element when said crimping arms are crimped to the encapsulated beam member and wiping element assembly, said means of frictionally maintaining its position comprising at least one of the following: plastic, wood, tape, paint, adhesive, epoxy, foil, rubber, metalized spray, or grit wrap.

11. The windshield wiper blade assembly of claim 1, wherein said connector element comprises two elements, a first windshield wiper blade assembly attaching element and a second universal windshield wiper arm attachment means, said second element couplingly attached to said first element, said first and said second element being attached to one another by at least one of the following means: gluing, welding, crimping, or bonding.

12. The windshield wiper blade assembly of claim 11, wherein said second universal windshield wiper arm attachment means comprises means for universally attaching said wiper blade assembly to at least one of the following wiper arm styles: large lateral pin, small lateral pin, large hook end, small hook end, and bayonet.

13. A windshield wiper blade assembly comprising:
a resilient wiping element, said wiping element comprising a longitudinal passage therethrough;
a semi-rigid, encapsulated beam member, said encapsulated beam member positioned within said longitudinal passage:
a windshield wiper connector element, said connector element universally detachably attaching said wiper blade assembly to at least one type of a windshield wiper arm attached to a motor vehicle, wherein
said wiper connector element is isolated from said encapsulated beam member;
said connector element coupled by securement means to said resilient wiping element and said encapsulated beam member in such a way as to prevent the rotation and twisting of the resilient wiper blade around said encapsulated beam member, and further preventing longitudinal translation of said encapsulated beam member within said resilient wiping member;
said resilient wiping member comprises a longitudinally extending raised airfoil element positioned on an upper side of the windshield wiping element;
said securement means of said connector element comprises at least two lateral, downward projecting crimping arms, frictionally attaching to said encapsulated beam and wiping element:
said downward projecting crimping arms comprise at least one pair of apertures therein, through which resilient wiping element is partially forced within when said crimping arms are crimped to the encapsulated beam member and wiping element assembly.

14. The windshield wiper blade assembly of claim 13, wherein said encapsulated beam member comprises a plurality of lateral detents, aligned with said apertures of said crimping arms proximal the attachment location of said connector element, through which resilient wiping element is partially forced within when said crimping arms are crimped to the encapsulated beam member and wiping element assembly.

15. A windshield wiper blade assembly comprising:
a resilient wiping element, said wiping element comprising a longitudinal passage therethrough, and at least one pair of lateral through passages, proximal said wiping elements midpoint;
a semi-rigid, encapsulated beam member, said encapsulated beam member positioned within said longitudinal passage and having at least one pair of laterally outward projecting attachment tabs, said attachment tabs extending through said lateral through passages of said wiping element;
a single windshield wiper connector element located at an approximate mid-point of said encapsulated beam member, said connector element universally detachably attaching said wiper blade assembly to at least one type of a windshield wiper arm attached to a motor vehicle, said connector element coupled by securement means to said resilient wiping element and said encapsulated beam member in such a way as to prevent the rotation and twisting of the resilient wiper blade around said encapsulated beam member, and further preventing longitudinal translation of said encapsulated beam member within said resilient wiping member, said securement means comprising at least one pair of lateral downward projecting crimping tabs for frictionally holding said connector element to said resilient wiping element and said encapsulated beam member, and further comprising at least one pair of lateral, downward projecting attachment tabs having receiving apertures which attach to said outward projecting attachment tabs of said encapsulated beam member.

16. The windshield wiper blade assembly of claim 15, wherein said windshield wiper connector element comprises an upper universal connector element and an intermediate transition member comprising at least one pair of lateral, downward projecting attachment tabs having receiving apertures which attach to said outward projecting attachment tabs of said encapsulated beam member, and at least one pair of lateral, upward projecting attachment tabs having inward projecting locking tabs which are received within corresponding apertures within said upper universal connector element.

17. A windshield wiper blade assembly comprising:
a resilient wiping element, said wiping element comprising a longitudinal passage therethrough;
a semi-rigid, encapsulated beam member, said encapsulated beam member positioned within said longitudinal passage;
a windshield wiper connector element, said connector element universally detachably attaching said wiper blade assembly to at least one type of a windshield wiper arm attached to a motor vehicle, wherein
said wiper connector element is isolated from said encapsulated beam member;
said connector element coupled by securement means to said resilient wiping element and said encapsulated beam member in such a way as to prevent the rotation and twisting of the resilient wiper blade around said encapsulated beam member, and further preventing longitudinal translation of said encapsulated beam member within said resilient wiping member;

said resilient wiping member comprises a longitudinally extending raised airfoil element positioned on an upper side of the windshield wiping element;
said securement means of said connector element comprises at least two lateral, downward projecting crimping arms, frictionally attaching to said encapsulated beam and wiping element;
said downward projecting crimping arms are biased against said encapsulated beam member and said wiping element, frictionally attaching said connector element to said encapsulated beam member and wiping element by means of a collar pressed downward over said connector element and said crimping arms.

18. The windshield wiper blade assembly of claim 17, wherein said collar comprises a means for universally attaching said wiper blade assembly to at least one of the following wiper arm styles: large lateral pin, small lateral pin, large hook end, small hook end, and bayonet.

19. The windshield wiper blade assembly of claim 18, wherein said resilient wiping member comprises a longitudinally extending raised airfoil element positioned on an upper side of the windshield wiping element, having a centrally positioned cutout in said airfoil for receiving said collar, said collar attaching to said resilient wiping element and said beam assembly by a pair of longitudinal extending tabs in said collar, which are received within corresponding apertures in said raised airfoil of said resilient wiping element.

20. The windshield wiper blade assembly of claim 18, wherein said means for universally attaching said wiper blade assembly to said wiper arm is pivotally attached to said collar at a first end of said collar and detachably attachable at a second end of said collar.

21. The windshield wiper blade assembly of claim 18, wherein there is a smooth transition between said airfoil element and said connector element.

* * * * *